(12) United States Patent
Sasaki et al.

(10) Patent No.: US 10,361,929 B2
(45) Date of Patent: Jul. 23, 2019

(54) INFORMATION DISPLAYING DEVICE, INFORMATION PROCESSING DEVICE, INFORMATION DISPLAYING SYSTEM, AND INFORMATION DISPLAYING METHOD

(71) Applicant: YOKOGAWA ELECTRIC CORPORATION, Musashino-shi, Tokyo (JP)

(72) Inventors: Hirokazu Sasaki, Tokyo (JP); Naoyuki Fujimoto, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 0 days.

(21) Appl. No.: 15/111,519

(22) PCT Filed: Jan. 14, 2015

(86) PCT No.: PCT/JP2015/050739
§ 371 (c)(1),
(2) Date: Jul. 14, 2016

(87) PCT Pub. No.: WO2015/118914
PCT Pub. Date: Aug. 13, 2015

(65) Prior Publication Data
US 2016/0352592 A1    Dec. 1, 2016

(30) Foreign Application Priority Data

Feb. 4, 2014 (JP) .................................. 2014-019594

(51) Int. Cl.
*H04L 12/26* (2006.01)
*G05B 19/042* (2006.01)

(52) U.S. Cl.
CPC ........ *H04L 43/045* (2013.01); *G05B 19/0428* (2013.01); *H04L 43/0823* (2013.01); *H04L 43/0894* (2013.01); *G05B 2219/1208* (2013.01)

(58) Field of Classification Search
None
See application file for complete search history.

(56) References Cited

U.S. PATENT DOCUMENTS

2002/0060995 A1* 5/2002 Cervello ............... H04W 72/02
                                                                370/332
2004/0137908 A1* 7/2004 Sinivaara ............... H04B 7/022
                                                                455/452.1
(Continued)

FOREIGN PATENT DOCUMENTS

EP    2 814 285 A1    12/2014
JP    2003-244146 A    8/2003
(Continued)

*Primary Examiner* — Jeffrey M Rutkowski
*Assistant Examiner* — Andre Tacdiran
(74) *Attorney, Agent, or Firm* — Sughrue Mion, PLLC

(57) ABSTRACT

An information displaying device has a display and a display controller. The display controller displays, on the display, statistic information associated with device identification information for identifying a field device. The statistic information is obtained by an information processing device which statistically processes communication quality information over a predetermined period. The communication quality information representing a communication quality between the field device installed in a plant and the information processing device.

20 Claims, 16 Drawing Sheets

(56) References Cited

U.S. PATENT DOCUMENTS

| | | | |
|---|---|---|---|
| 2004/0156399 A1* | 8/2004 | Eran | H04J 13/0048 |
| | | | 370/395.5 |
| 2005/0052992 A1* | 3/2005 | Cloonan | H04L 41/5025 |
| | | | 370/229 |
| 2008/0164407 A1* | 7/2008 | Choquette | G01T 1/20 |
| | | | 250/262 |
| 2008/0188972 A1* | 8/2008 | Miller | G05B 19/4184 |
| | | | 700/110 |
| 2009/0168602 A1* | 7/2009 | Wilcox | G01V 1/223 |
| | | | 367/76 |
| 2010/0008249 A1* | 1/2010 | Fukuyama | H04L 12/56 |
| | | | 370/252 |
| 2012/0134280 A1 | 5/2012 | Rotvold et al. | |
| 2012/0182911 A1 | 7/2012 | Fujimoto et al. | |
| 2012/0210088 A1* | 8/2012 | Iizuka | G06F 12/0238 |
| | | | 711/166 |
| 2013/0173854 A1* | 7/2013 | Shim | G06F 12/0246 |
| | | | 711/103 |
| 2015/0222504 A1* | 8/2015 | Srivastava | H04L 43/0823 |
| | | | 709/224 |
| 2016/0302148 A1* | 10/2016 | Buck | H04W 52/0212 |

FOREIGN PATENT DOCUMENTS

| | | |
|---|---|---|
| JP | 2009-165099 A | 7/2009 |
| JP | 2012-147298 A | 8/2012 |
| JP | 2013-114471 A | 6/2013 |

* cited by examiner

FIG. 8

Field Device List

Subnet Status: ● 10016  ⊘ 10017  ● 10018  ○ 10019  ○ 10020
              ⊘ All  ⊘ 10001  ● 10002  ⊘ 10003  ⊘ 10004  ⊘ 10005  ● 10006  ○ 10007  ○ 10008  ○ 10009  ○ 10010  ○ 10011  ○ 10012  ○ 10013  ○ 10014  ⊘ 10015

[Display Items]

| | Device Tag | Network ID | Vendor/Model | Device Role | Join Status | Operation Status | Interval | Latency | Primary Router | RSSI (P) | PER (P) | Secondary Router | RSSI (S) | PER (S) | CCA Back off | Battery Life | Power Supply Status |
|---|---|---|---|---|---|---|---|---|---|---|---|---|---|---|---|---|---|
| ○ | DEV001 | 1233 | VENDOR_A/MODEL_A | IO+Router | Full Join(1) | Published | 1.1times | 0.5sec | BBR001 | -80dBm | 0% | BBR002 | -80dBm | 0% | 1% (11ch) | 1254days | 100-75% |
| ⊘ | DEV002 | 220 | VENDOR_A/MODEL_A | IO+Router | Full Join(1) | Published | 1.2times | 0.6sec | BBR002 | -81dBm | 1% | BBR001 | -81dBm | 1% | 12% (12ch) | 2012days | 100-75% |
| ● | DEV003 | 1233 | VENDOR_A/MODEL_A | Router | Disconnected(1) | Not publish | - | - | - | - | - | - | - | - | - | - | - |
| ⊘ | DEV004 | 1233 | VENDOR_A/MODEL_A | IO | Full Join(1) | Published | 1.5times | 0.5sec | DEV001 | -83dBm | 1% | DEV002 | -83dBm | 1% | 15% (24ch) | 50days | 75-25% |
| ○ | DEV005 | 1233 | VENDOR_A/MODEL_A | IO | Full Join(1) | Published | 1.6times | 0.6sec | DEV002 | -84dBm | 1% | DEV001 | -84dBm | 1% | 15% (24ch) | 15days | 25-0% |
| ○ | DEV006 | 1233 | VENDOR_A/MODEL_A | IO | Full Join(1) | Published | 1.2times | 0.3sec | BBR001 | -85dBm | 1% | BBR002 | -85dBm | 1% | 5% (11ch) | 60days | 75-25% |
| ○ | DEV007 | 1233 | VENDOR_A/MODEL_A | IO | Full Join(1) | Published | 1.2times | 0.4sec | BBR001 | -86dBm | 1% | BBR002 | -86dBm | 1% | 12% (12ch) | 10days | 25-0% |
| ○ | DEV008 | 1233 | VENDOR_A/MODEL_A | IO | Full Join(1) | Published | 1.1times | 0.5sec | BBR001 | -87dBm | 1% | BBR002 | -87dBm | 1% | 12% (12ch) | 1254days | 100-75% |
| ○ | DEV009 | 220 | VENDOR_A/MODEL_A | IO | Full Join(1) | Published | 1.2times | 0.5sec | BBR001 | -88dBm | 1% | BBR002 | -88dBm | 1% | 15% (24ch) | 2012days | 100-75% |
| ○ | DEV010 | 220 | VENDOR_A/MODEL_A | IO | Full Join(1) | Published | 1.2times | 0.5sec | BBR001 | -89dBm | 5% | BBR002 | -89dBm | 5% | 50% (11ch) | 1254days | 100-75% |

Last Update: 2013/08/20 13:22:01

FIG. 9

| Device Tag | Model | Publication Period | Alert Threshold | Status | Publication Loss | Interval | Latency | PER | Power Status |
|---|---|---|---|---|---|---|---|---|---|
| GW001-1 | MDL-SMGW | — | — | | | | | | |
| GW001-2 | MDL-SMGW | — | — | ⊘ | | | | | |
| BBR001 | MDL-BBR | — | — | ⊘ | | | | | |
| BBR002 | MDL-BBR | — | — | ⊗ | | | | | |
| DEV001 | MODEL_A | 1sec | B | ⊘ | | | | | |
| DEV002 | MODEL_B | 30sec | A | ⊘ | | | | | |
| DEV003 | MODEL_A | 1sec | B | | | | | | |
| DEV004 | MODEL_A | — | A | | | | | | |
| DEV005 | www... | — | Disable | | | | | | |
| DEV006 | MODEL_B | 30sec | Disable | | | | | | |
| DEV011 | MODEL_B | 30sec | B | | | | | | 2100days |
| DEV012 | MODEL_A | 1sec | A | | ⊘ | ⊘ | ⊘ | ⊘ | 29days |
| DEV013 | MODEL_A | 1sec | A | | ① | ① | ① | ① | 2days |
| DEV014 | MODEL_A | — | A | | ② | ⊗ | ② | ② | ? |
| DEV015 | MODEL_B | 30sec | Disable | | | | | | |
| DEV016 | MODEL_B | 30sec | Disable | | | | | | |
| DEV017 | MODEL_A | 1sec | B | | | | | | |

FIG. 10
| STATE NAME (C31) | Power Supply Status (C32) | IMAGE (C33) |
|---|---|---|
| NORMAL | Line Powered |  |
| NORMAL | 100-75% | 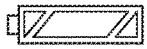 |
| NORMAL | 75-25% |  |
| NORMAL | 25-0% | 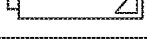 |
| ALERT | 100-75% |  |
| ALERT | 75-25% | 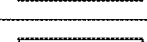 |
| ALERT | 25-0% | 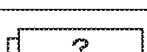 |
| UNKNOWN | Unknown | 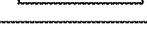 |

FIG. 14

INFORMATION DISPLAYING DEVICE, INFORMATION PROCESSING DEVICE, INFORMATION DISPLAYING SYSTEM, AND INFORMATION DISPLAYING METHOD

CROSS REFERENCE TO RELATED APPLICATIONS

This application is a National Stage of International Application No. PCT/JP2015/050739 filed Jan. 14, 2015, claiming priority based on Japanese Patent Application No. 2014-019594 filed Feb. 4, 2014, the contents of all of which are incorporated herein by reference in their entirety.

TECHNICAL FIELD

The present invention relates to an information displaying device, an information processing device, an information displaying system, and an information displaying method.

BACKGROUND ART

Conventionally, in a plant and a factory, a distributed control system (DCS) is established in order to implement advanced automatic operations. Field devices (a measurement device and an operation device) and a controller managing and controlling them are connected to each other via a communication means in the distributed control system. It is desirable that information is transmitted from the field device to the controller without losing the information and delaying, in order to stabilize operation of the plant and the factory.

For example, indices such as a packet error rate (PER), a received signal strength indication (RSSI), and a delay between transmission and reception (Latency), are used for monitoring and setting a communication route. A device which sets a wireless route based on these indices is provided.

CITATION LIST

Patent Literature

[Patent document 1] Japanese Unexamined Patent Application Publication No. 2012-147298

SUMMARY OF INVENTION

Technical Problem

However, if the conventional technology is used, there is a case that it is unclear whether the communication route is stable for a long time or not. For example, the controller obtains information, such as the packet error rate and the received signal strength indication, at any time and uses them for monitoring and controlling, but the information, such as the packet error rate and the received signal strength indication, has not been saved. Therefore, a change-with-time of communication quality of the communication route cannot be analyzed, and there is a case that it cannot be shown whether the communication route is stable for a long time or not.

The present invention is made in view of the above-mentioned situation, and provides an information displaying device, an information processing device, an information displaying system, and an information displaying method for intelligibly showing whether the communication route is stable for a long time or not.

Solution to Problem

In order to solve the above-described problem, an information displaying device of the present invention includes a display, and a display controller configured to display, on the display, statistic information associated with device identification information for identifying a field device. The statistic information is obtained by an information processing device which statistically processes communication quality information over a predetermined period. The communication quality information represents a communication quality between the field device installed in a plant and the information processing device.

Moreover, in the information displaying device of the present invention, the communication quality information is information calculated by using at least one of communication normality information and process data which have been transmitted from the field device.

Moreover, in the information displaying device of the present invention, the display controller is configured to display, on the display, device power supply information associated with the device identification information, and the device power supply information represents a battery residual quantity of the field device.

Moreover, the information displaying device of the present invention, the display controller is configured to display, on the display, a comparison result between the statistic information and a threshold value, which is associated with the device identification information, and the threshold value is set for determining whether the communication quality of the field device is good or not.

Moreover, the information displaying device of the present invention, a different value is settable for the each field device as the threshold value.

Moreover, the information displaying device of the present invention, the display controller is configured to display, on the display, a distribution of the communication quality information over a predetermined period, which is associated with the device identification information.

Moreover, the information displaying device of the present invention, the display controller is configured to display, on the display, the statistic information together with the distribution of the communication quality information.

Moreover, the information displaying device of the present invention, the display controller is configured to further display, on the display, a change-with-time of the communication quality information.

Moreover, the information displaying device of the present invention, the display controller is configured to display, on the display, a notification associated with the device identification information, and the notification represents that another communication route, which is better in a communication quality represented by the communication quality information than a communication route currently used by the field device, exists with respect to the same field device.

Moreover, an information processing device of the present invention includes a calculator configured to calculate communication quality information by using at least one of communication normality information and process data which have been transmitted from a field device installed in a plant, the communication quality information representing a communication quality of the field device, a statistic processor configured to obtain statistic information by statistically processing the communication quality information calculated by the calculator over a predetermined period, and an output device configured to output the statistic information obtained by the statistic processor.

Moreover, an information displaying system of the present invention, which displays information obtained from a plant, includes an information processing device and an information displaying device. The information processing device includes a calculator configured to calculate communication quality information by using at least one of communication normality information and process data which have been transmitted from a field device installed in the plant, the communication quality information representing a communication quality of the field device, a statistic processor configured to obtain statistic information by statistically processing the communication quality information calculated by the calculator over a predetermined period, and an output device configured to output the statistic information obtained by the statistic processor. The information displaying device is configured to display the statistic information output from the information processing device.

Moreover, the information displaying system of the present invention, the information displaying device includes a display, and a display controller configured to display, on the display, the statistic information associated with device identification information for identifying the field device.

Moreover, an information displaying method of the present invention includes a first step of obtaining statistic information by statistically processing communication quality information over a predetermined period, the communication quality information representing a communication quality between a field device installed in a plant and an information processing device, and a second step of displaying, on the display, the statistic information obtained in the first step, associated with device identification information for identifying the field device.

Moreover, the information displaying method of the present invention, further includes a third step of calculating communication quality information by using at least one of communication normality information and process data which have been transmitted from the field device installed in the plant, the communication quality information representing a communication quality of the field device.

Advantageous Effects of Invention

According to the present invention, it can be shown intelligibly whether the communication route is stable for a long time or not.

BRIEF DESCRIPTION OF DRAWINGS

FIG. 8 is a drawing illustrating an example of display mode in a case of displaying the latest data.

FIG. 9 is a drawing illustrating an example of display mode in a case of displaying the statistic report in the present embodiment.

FIG. 10 is a table showing an example of a selecting method of display mode in a case of displaying the device power supply information.

FIG. 14 is a drawing illustrating an example of display mode in a case of displaying the latest data.

DESCRIPTION OF EMBODIMENTS

[Outline of Information Displaying System]

Hereinafter, a first embodiment of the present invention will be described in detail, referring to drawings.

Figure 1:
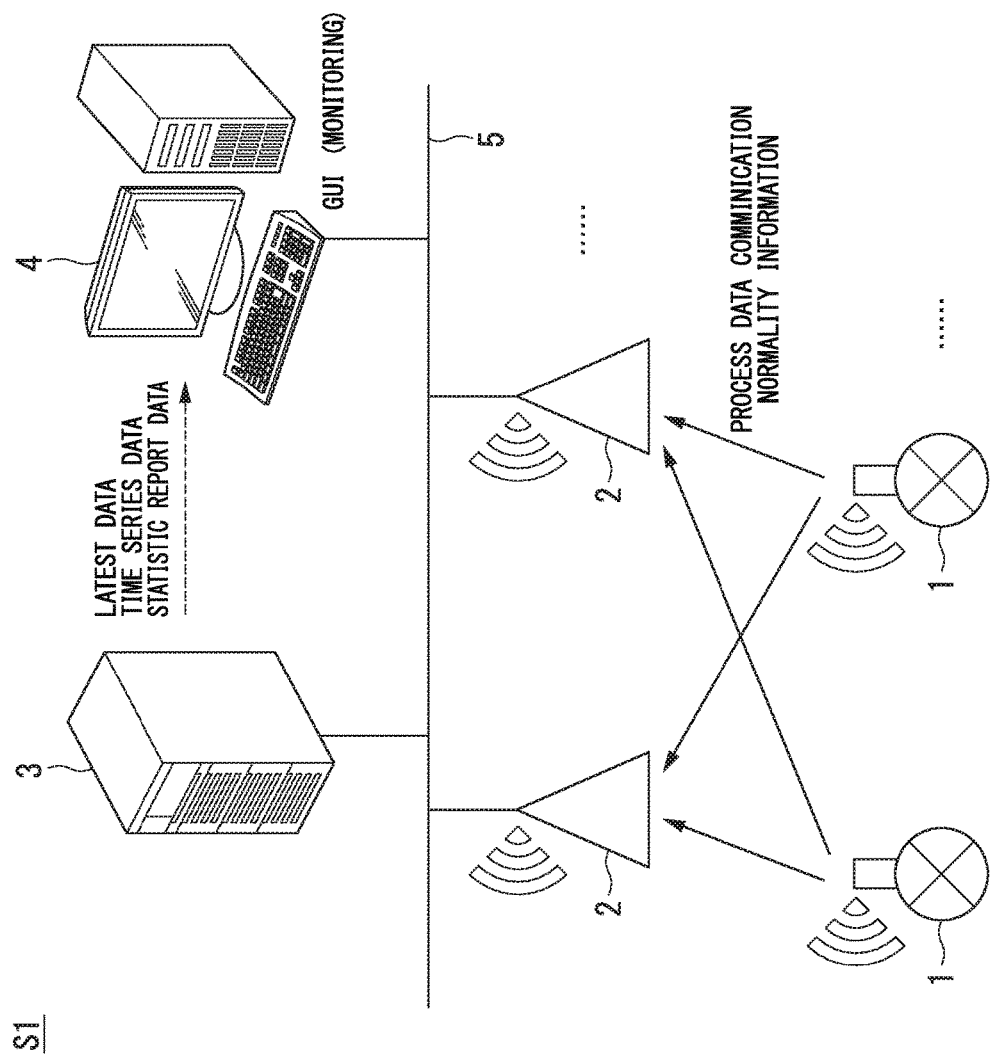
FIG. 1 is a conceptual diagram of an information displaying system in an embodiment of the present invention.

FIG. 1 is a conceptual diagram of an information displaying system S1 in an embodiment of the present invention.

The information displaying system S1 is a system for managing and controlling field devices in a plant or a factory. The plant includes an industrial plant such as a chemical industrial plant, a plant managing and controlling a wellhead (for example, a gas field and an oil field), a plant managing and controlling a generation of electric power (for example, water power, fire power, and nuclear power), a plant managing and controlling a power harvesting (for example, solar power and wind power), a plant managing and controlling water supply and sewerage systems, a dam, and so on. The information displaying system S1 is equipped with field devices 1, access points 2, an information processing device 3, and an information displaying device 4.

The field device 1 is such as a sensor device (for example, a flowmeter and a temperature sensor), a valve device (for example, a flow control valve and an on-off valve), an actuator device (for example, a fan and a motor), an imaging device (for example, a camera and a video camera recording circumstances and objects in the plant), a sound device (for example, a microphone collecting abnormal noise in the plant, and a speaker generating alarm sound), a position detection device outputting position information of the each device, and other devices. For example, the access point 2 is a backbone router. The information processing device 3 is a device which processes information obtained from the plant. For example, the information processing device 3 is a device such as a gateway and a system manager. The information displaying device 4 is a device equipped with a display which displays, by using a GUI (Graphical User Interface), information obtained from the plant.

The field device 1 and the access point 2 perform wireless communication in conformity with an industrial wireless communication standard, such as ISA100.11a and WirelessHART (registered trademark). For example, the field device 1 can perform redundant communication with respect to two or more access points 2 of a first route and a second route. Moreover, the field device 1 has a function of switching the access point 2, which communicates as the first route or the second route, in accordance with setting. The access point 2, the information processing device 3, and the information displaying device 4 communicate with each other through the network 5. For example, the network 5 is a backbone network.

Figure 2:
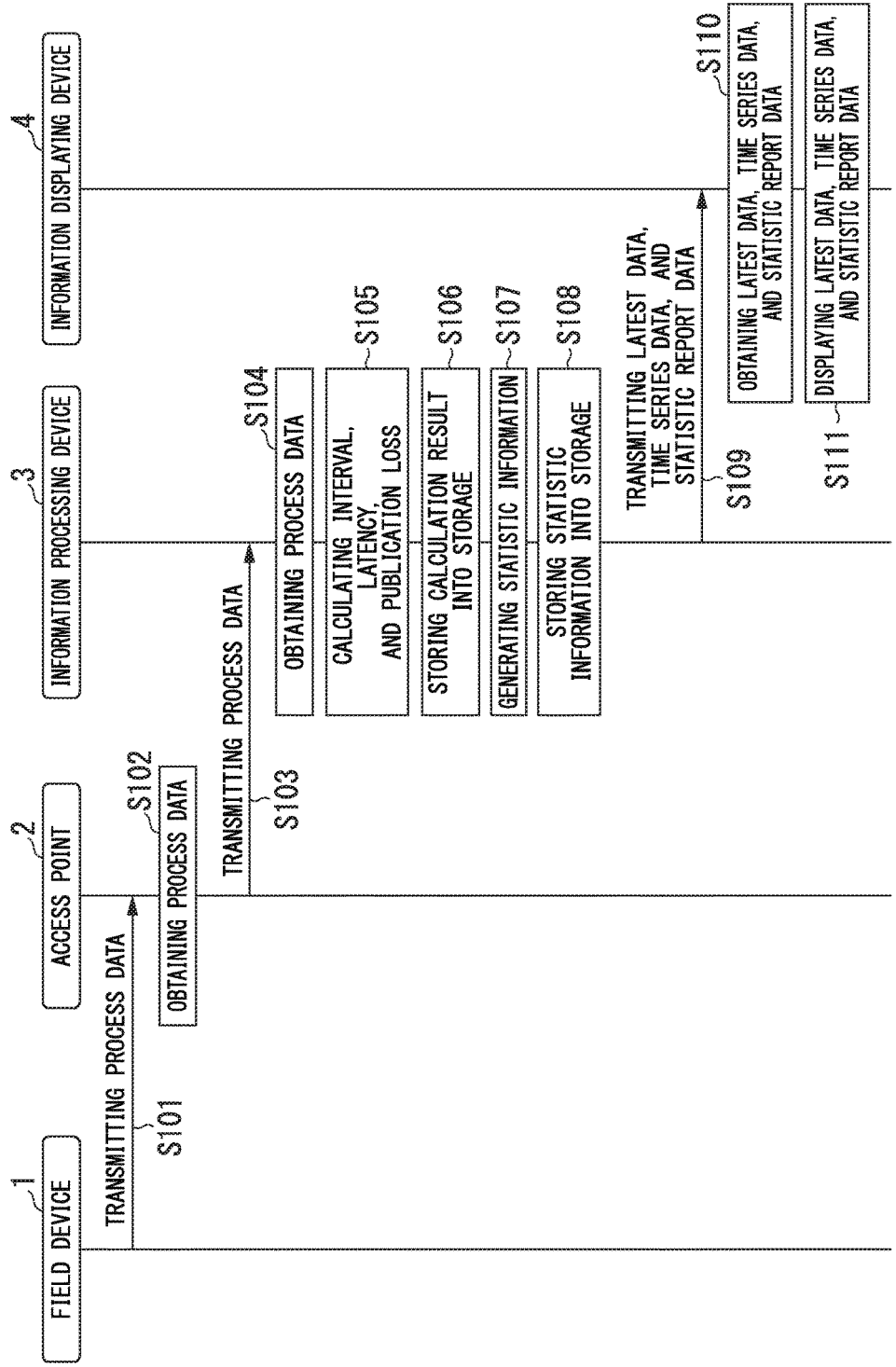
FIG. 2 is a sequence diagram illustrating a first example of operation of the information displaying system.

FIG. 2 is a sequence diagram illustrating a first example of operation of the information displaying system S1.

First, the field device 1 obtains process data, such as flow quantity, pressure, temperature of measurement target fluid, and transmits the obtained process data to the access point 2 through the wireless communication (Step S101). Here, the process data includes transmission time information (time stamp) which represents transmission time and a sequence number which represents a data number, and the process data is transmitted at a predetermined cycle. Next, the access point 2 obtains the process data (Step S102), and the access point 2 transmits the obtained process data to the information processing device 3 (Step S103).

Next, the information processing device 3 obtains the process data (Step S104), and the information processing device 3 calculates a reception interval (Interval), a delay between transmission and reception (Latency), and a loss number of process data (Publication Loss) based on the obtained process data (Step S105). The reception interval, the delay between transmission and reception, and the loss number of process data are communication quality information which represents a communication quality of the communication route from the field device 1 to the information processing device 3. A calculation method of the communication quality information will be described later. The information processing device 3 stores the communication quality information of the calculation result into the storage of the self-device as latest data (Step S106). Next, the information processing device 3 generates statistic information by statistically processing the communication quality information of the calculation result over a predetermined period (Step S107).

Here, in the present embodiment, the statistic information includes time series data, which is associated with time, and statistic report data. The time series data includes every minute data, every hour data, and every day data. The every minute data is data obtained by statistically processing the communication quality information for one minute. The every hour data is data obtained by statistically processing the communication quality information for one hour. The every day data is data obtained by statistically processing the communication quality information for one day. The latest data and the time series data include operational state information which represents an operation state of the field device 1. The statistic report data is data obtained by collecting information for displaying the statistic report, which will be described later.

Next, the information processing device 3 stores the generated statistic information into the storage of the self-device (Step S108). The information processing device 3 transmits the latest data, the time series data, and the statistic report data to the information displaying device in accordance with a request from the information displaying device 4 (Step S109). The information displaying device 4 obtains the latest data, the time series data, and the statistic report data (Step S110), and the information displaying device 4 displays the obtained information (Step S111).

Figure 3:
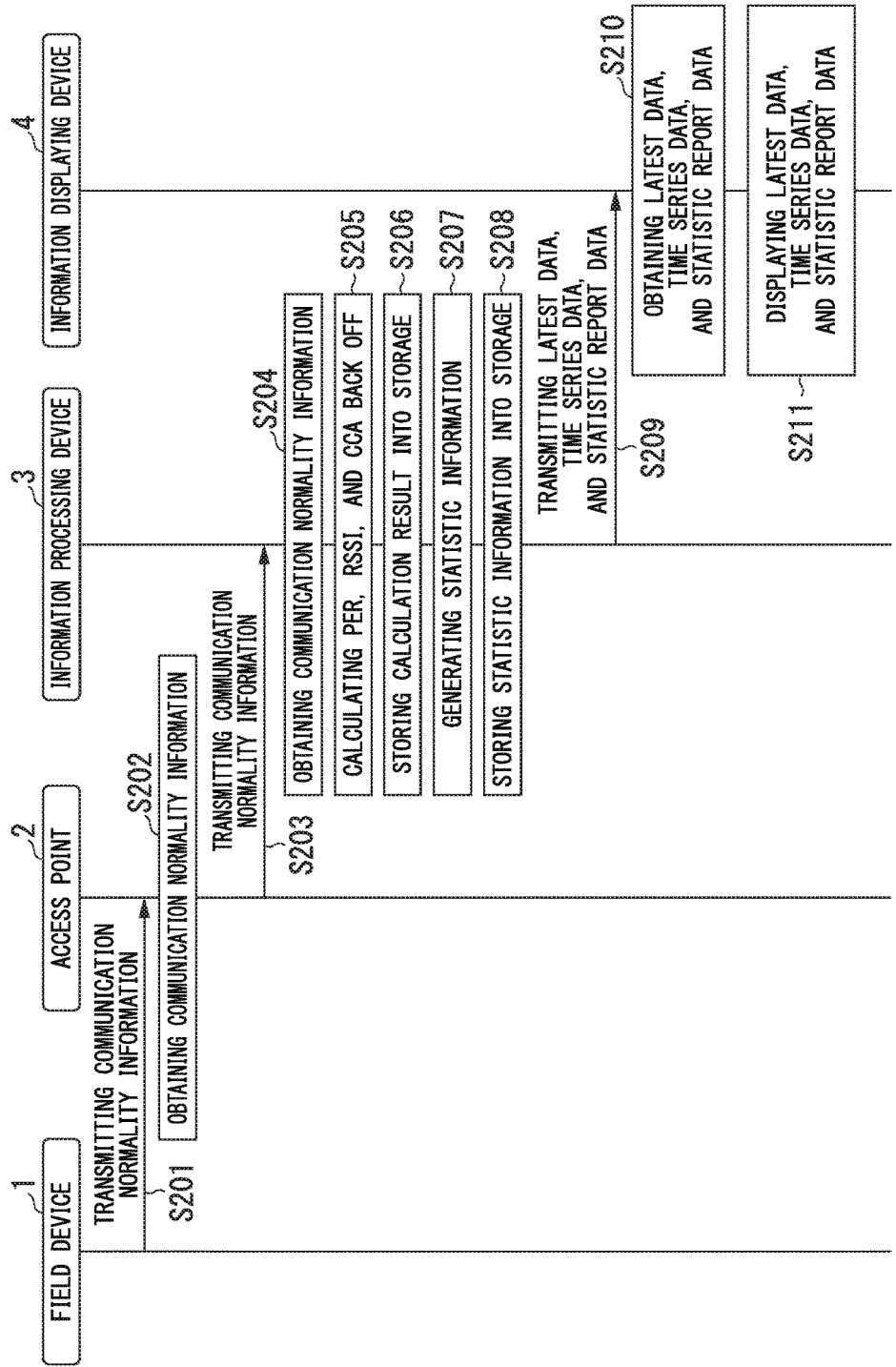
FIG. 3 is a sequence diagram illustrating a second example of operation of the information displaying system.

FIG. 3 is a sequence diagram illustrating a second example of operation of the information displaying system S1.

First, the field device 1 transmits communication normality information to the access point 2 through the wireless communication (Step S201). Here, the communication normality information includes a number of times of communication success of wireless communication, a number of times of communication failure, a measured received signal strength indication, a used channel number, and a number of times of backed-off transmission, and the communication normality information is transmitted at a predetermined cycle. Moreover, the field device 1 may obtain the communication normality information with respect to the each access point 2 which exists in a range where the self-device can communicate. Next, the access point 2 obtains the communication normality information (Step S202), and the access point 2 transmits the obtained communication normality information to the information processing device 3 (Step S203).

Next, the information processing device 3 obtains the communication normality information (Step S204), and the information processing device 3 calculates a packet error rate (PER), a received signal strength indication (RSSI), and a backed-off transmission rate (CCA Back off), based on the obtained communication normality information (Step S205). The CCA is an abbreviation of Clear Channel Association. The packet error rate, the received signal strength indication, and the backed-off transmission rate are communication quality information. A calculation method of the communication quality information will be described later. The information processing device 3 stores the communication quality information of the calculation result into the storage of the self-device as latest data (Step S206). Since the processing from Step S207 to Step S211 is the same as the processing from Step S107 to Step S111 shown in FIG. 2, explanation of them is omitted. The field device 1 transmits, to the information processing device 3, device power supply information which represents a state of power supply of the self-device. Moreover, if the power supply is a battery, the device power supply information includes information of a battery residual quantity.

[Outline of Information Processing Device]

Figure 4:
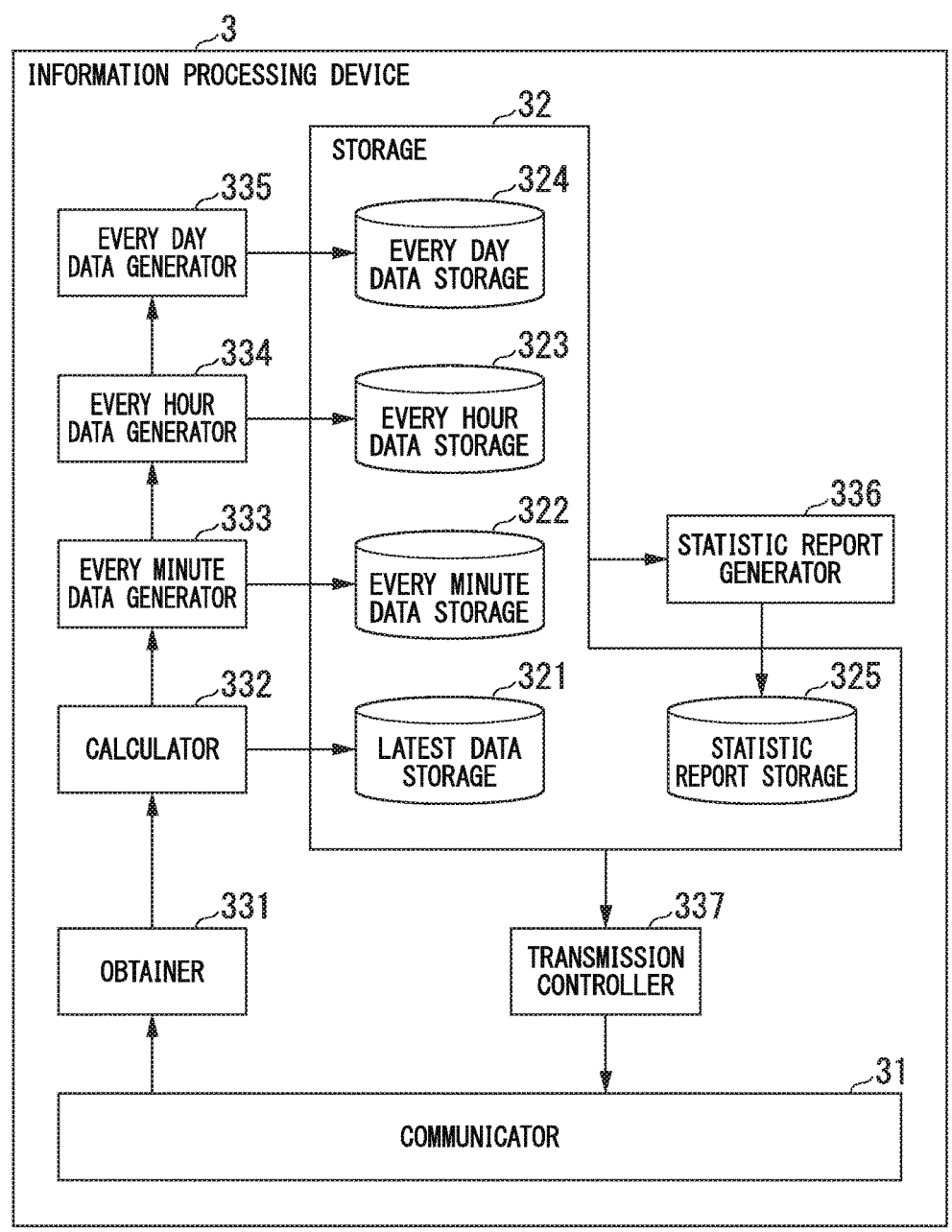
FIG. 4 is a block diagram illustrating an example of a schematic functional configuration of the information processing device.

FIG. 4 is a block diagram illustrating an example of a schematic functional configuration of the information processing device 3.

The information processing device 3 is equipped with a communicator 31, a storage 32, an obtainer 331, a calculator 332, an every minute data generator 333, an every hour data generator 334, an every day data generator 335, a statistic report generator 336, and a transmission controller 337. Moreover, the information processing device 3 is equipped with a CPU (Central Processing Unit) and a storage device therein.

The communicator 31 has a communication interface connected to the network 5, and the communicator 31 communicates with the access point 2 and the information displaying device 4.

For example, the storage 32 is equipped with a main storage device, such as a ROM (Read Only Memory) and a RAM (Random Access Memory), and an auxiliary storage device. For example, these storage devices are configured by using a large capacity nonvolatile memory such as a flash memory, a large capacity volatile memory such as a DRAM (Dynamic Random Access Memory), or a small capacity nonvolatile memory such as a FeRAM (Ferroelectric Random Access Memory).

Moreover, the storage 32 stores various types of programs, such as firmware and an application program, executed by the CPU in the information processing device 3, and the storage 32 also stores a result of processing executed by the CPU. For example, the storage 32 stores setting information which represents a transmission time interval of the process data for the each device. Moreover, for example, the storage 32 stores setting information of a threshold value for the each device, which is used for determination processing performed by the statistic report generator 336. Moreover, for example, the storage 32 stores channel assignment information which represents assignment with respect to slots of a used channel number of a device. For example, the CPU of the information processing device 3 executes the program stored in the storage 32 so that the obtainer 331, the calculator 332, the every minute data generator 333, the every hour data generator 334, the every day data generator 335, the statistic report generator 336, and the transmission controller 337 can function.

Moreover, the storage 32 is equipped with a latest data storage 321, an every minute data storage 322, an every hour data storage 323, an every day data storage 324, and a statistic report storage 325.

The latest data storage 321 stores latest data of the communication quality information.

The every minute data storage 322 stores every minute data which is communication quality information obtained by statistically processing the latest data of the time series data every minute.

The every hour data storage 323 stores every hour data which is communication quality information obtained by statistically processing the every minute data of the time series data every hour.

The every day data storage 324 stores every day data which is communication quality information obtained by statistically processing the every hour data of the time series data every day.

The statistic report storage 325 stores statistic report data generated based on the communication quality information.

Figure 5:
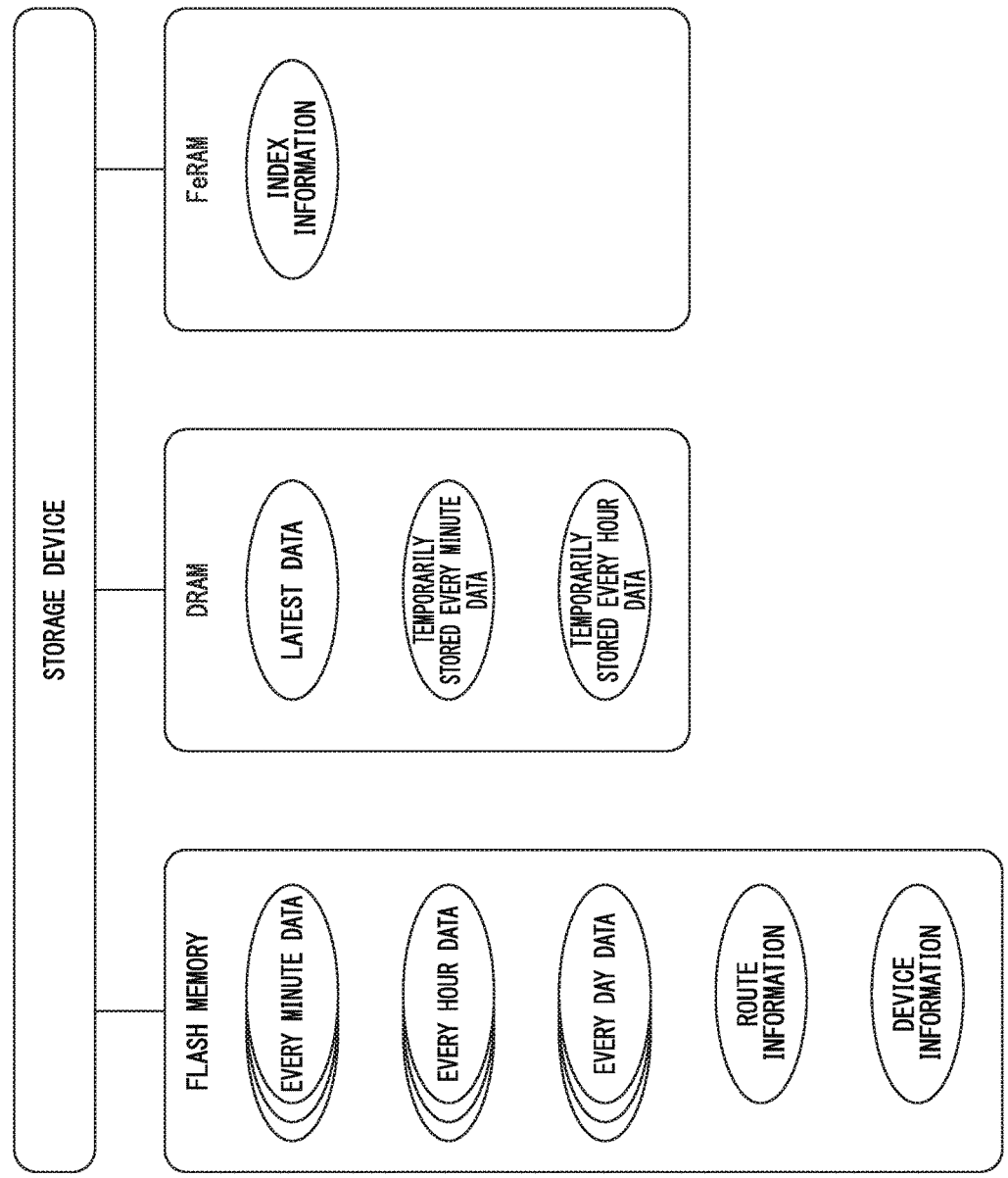
FIG. 5 is a drawing illustrating an example of a type of the storage device storing data which is to be processed by the information processing device.

FIG. 5 is a drawing illustrating an example of a type of the storage device storing data which is to be processed by the information processing device 3.

A flash memory is a large scale memory, and data is not lost even if a power supply is turned off. However, the flash memory has a characteristic that a life about a number of writing times is short. The flash memory stores the every minute data, the every hour data, the every day data, route information, device information, and so on. The route information represents connection state of the each device in the information displaying system S1. The device information represents type, setting, and identification information of the each device.

If a power supply is turned off, data of a DRAM is lost. However, the DRAM is a large scale memory, and the DRAM has a characteristic that a life about a number of writing times is long. The DRAM stores the latest data, temporarily stored data of the every minute data (temporarily stored every minute data), and temporarily stored data of the every hour data (temporarily stored every hour data). The temporarily stored data of the every minute data is used for calculating the every hour data. The temporarily stored data of the every hour data is used for calculating the every day data.

Although a FeRAM is a small scale memory, the FeRAM has a characteristic that data is not lost even if a power supply is turned off. The FeRAM stores index information which is information about storage location of each data stored in the flash memory.

As described above, although the flash memory is a non-volatile memory, the number of writing times is limited. Therefore, in the present embodiment, the information processing device 3 temporarily stores, into the DRAM, the latest data of which updating frequency is high, the every minute data which is calculated based on the latest data, and the every hour data which is calculated based on the every minute data. The number of writing times of the flash memory is reduced by moving the every minute data and the every hour data from the DRAM to the flash memory after storing them. Thereby, the information processing device 3 can suppress failure of the flash memory, and can hold data more stably. The every day data calculated based on the every hour data stored in the DRAM, the route information, and the device information may be directly stored into the flash memory because updating frequency of these data is low.

Returning to explanation of FIG. 4, the obtainer 331 obtains the process data and the communication normality information from the access point 2 through the communicator 31. The obtainer 331 outputs the obtained process data and the obtained communication normality information to the calculator 332.

The calculator 332 obtains the process data and the communication normality information from the obtainer 331, and the calculator 332 calculates communication quality information based on the obtained process data and the obtained communication normality information. The calculator 332 stores the latest data of the calculated communication quality information into the latest data storage 321, and the calculator 332 outputs the latest data to the every minute data generator 333.

The calculator 332 calculates the packet error rate of the communication normality information by the following formula (1) based on the number of times of communication failure and the number of times of communication success which are included in the communication normality information.

$$\text{PER } [\%] = 100 \times \text{number of times of communication failure}/(\text{number of times of communication success} + \text{number of times of communication failure}) \quad (1)$$

The parameter of the packet error rate may be determined based on measurement time and all number of communication times for determination.

The calculator 332 calculates an average value of the measured received signal strength indication, which is included in the communication normality information, in order to calculate the received signal strength indication. For example, the average value is calculated by a moving average.

The calculator 332 calculates the backed-off transmission rate of each channel by the following formula (2).

$$\text{Backed-off transmission rate } [\%] = 100 \times (\text{number of times of backed-off transmission of each channel})/(\text{total number of transmission slots of each channel}) \quad (2)$$

The total number of transmission slots of each channel is obtained from the channel assignment information stored in the storage 32.

The calculator 332 calculates a loss number of process data, which represents a number of lost process data, by the following formula (3).

Loss number of process data=(sequence number received most recently)−(sequence number received previously)−1    (3)

The calculator 332 calculates the delay between transmission and reception of process data by the following formula (4).

Delay between transmission and reception=(process data reception time of the information processing device 3)−(transmission time which is added by the field device when transmitting)    (4)

The calculator 332 calculates the reception interval of process data by the following formula (5).

Reception interval={(latest reception time)−(previous reception time)}/(predetermined transmission time interval)    (5)

Figure 6:
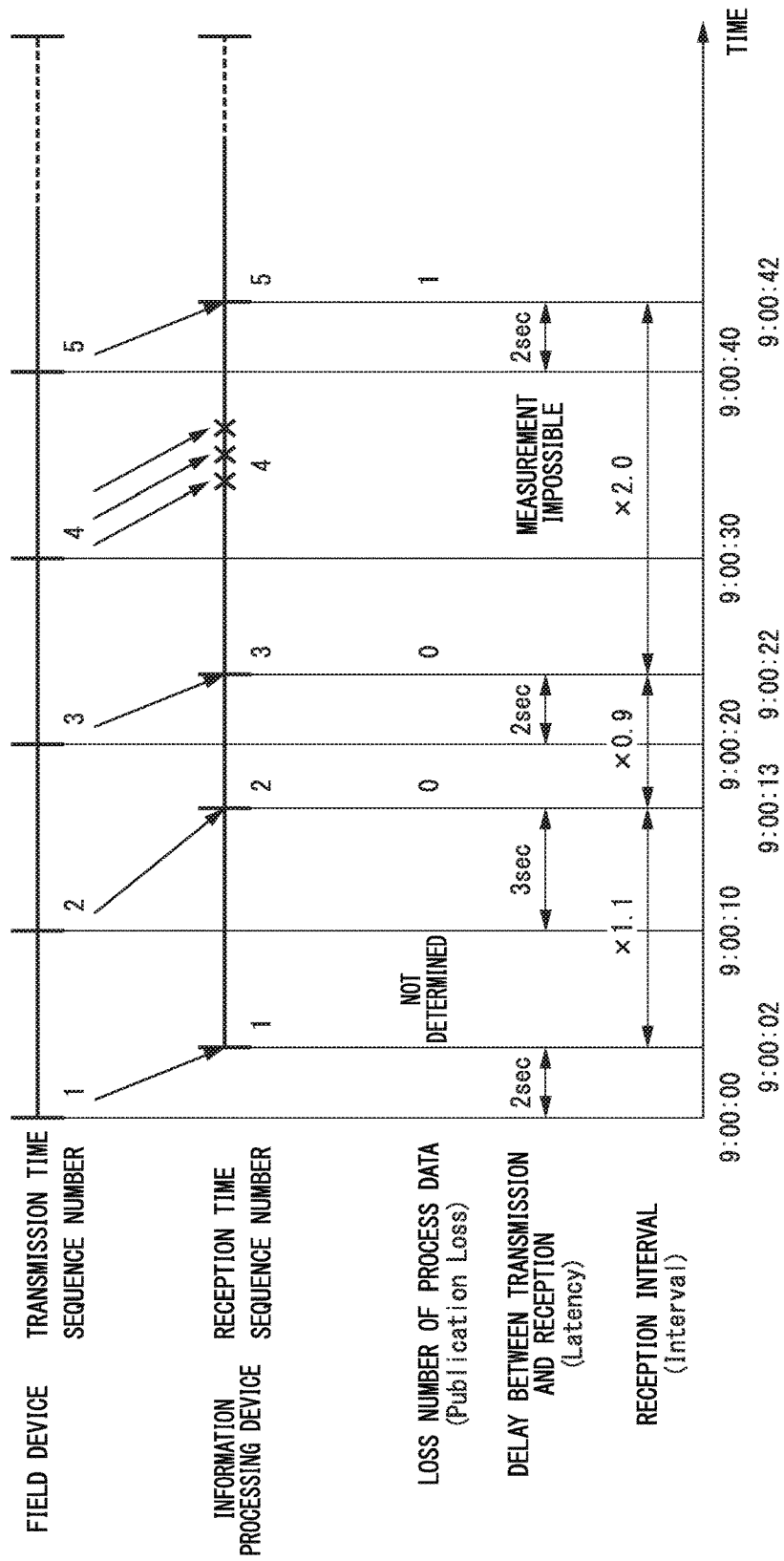
FIG. 6 is a timing chart illustrating the loss number of process data, the delay between transmission and reception, and the reception interval.

FIG. 6 is a timing chart illustrating the loss number of process data, the delay between transmission and reception, and the reception interval.

In FIG. 6, the horizontal axis shows time. An upper part of FIG. 6 shows a transmission time and a sequence number of process data transmitted by the field device 1. A middle part of FIG. 6 shows a reception time and a sequence number of process data obtained from the field device 1 by the information processing device 3. A lower part of FIG. 6 shows a loss number of process data, a delay between transmission and reception, and a reception interval. In the present embodiment, an internal clock of the field device 1 and an internal clock of the information processing device 3 are synchronized.

As shown in FIG. 6, for example, the field device 1 transmits the process data at an interval of ten seconds as a predetermined interval. The field device 1 adds one to the sequence number at every transmission. The information processing device 3 can identify the process data lost during the process of communication by checking the sequence number. For example, as shown in FIG. 6, if the information processing device 3 receives the process data of the sequence number "5" after receiving the process data of the sequence number "3", it is presumed that the process data of the sequence number "4" transmitted from the field device 1 was lost during the process of communication. Therefore, the information processing device 3 calculates "1" as the loss number of process data at the transmission time "9:00:40" by the formula (3). Like the process data of the sequence number "1" shown in FIG. 6, if the first process data is received, it is not necessary for the information processing device 3 to determine the loss number of process data.

The delay between transmission and reception represents the time until the process data transmitted from the field device 1 is received by the information processing device 3. As shown in FIG. 6, for example, the process data of the sequence number "2" was transmitted from the field device 1 at "9:00:10", and received by the information processing device 3 at "9:00:13". Therefore, the information processing device 3 calculates "3" seconds as the delay between transmission and reception at the transmission time "9:00:10" by the formula (4). Moreover, for example, the information processing device 3 does not measure the delay between transmission and reception about lost process data, like the process data of the sequence number "4" shown in FIG. 6.

The reception interval represents a reception interval of the process data in the information processing device 3. As shown in FIG. 6, the information processing device 3 received the process data of the sequence number "2" at "9:00:13", and received the process data of the sequence number "3" at "9:00:22". Moreover, in the example shown in FIG. 6, the transmission time interval of the process data from the field device 1 is 10 seconds. Therefore, the information processing device 3 calculates "0.9" as the reception interval at the transmission time "9:00:10" by the formula (5). After the information processing device 3 received the process data of the sequence number "3" at "9:00:22", the information processing device 3 did not receive the process data of the sequence number "4", but the information processing device 3 received the process data of the sequence number "5" at "9:00:42". Therefore, the information processing device 3 calculates "2.0" as the reception interval at the transmission time "9:00:20".

Returning to FIG. 4, and the explanation will be continued.

If the every minute data generator 333 obtains the latest data from the calculator 332, the every minute data generator 333 statistically processes the obtained latest data to generate every minute data. Specifically, for example, the every minute data generator 333 obtains a maximum value, a minimum value, and an average value about the latest data for one minute of the communication quality information, and the obtained values are taken as the every minute data of the communication quality information. For example, with respect to the loss number of process data, the data generator 333 obtains an integrated value of the latest data for one minute of the loss number of process data, and the obtained value is taken as the every minute data. For example, if the every minute data generator 333 generates the every minute data for one hour in the DRAM, the every minute data generator 333 stores the generated every minute data into the every minute data storage 322 of the flash memory, and the every minute data generator 333 outputs the every minute data to the every hour data generator 334.

If the every hour data generator 334 obtains the every minute data from the every minute data generator 333, the every hour data generator 334 statistically processes the obtained every minute data to generate every hour data. Specifically, the every hour data generator 334 obtains a maximum value, a minimum value, and an average value about the every minute data for one hour of the communication quality information, and the obtained values are taken as the every hour data of the communication quality information. For example, with respect to the loss number of process data, the every hour data generator 334 obtains an integrated value of the every minute data for one hour of the loss number of process data, and the obtained value is taken as the every hour data. Moreover, for example, if at least one of the operational state information which represents an abnormal state exists in the every minute data for one hour, the every hour data generator 334 determines that the every hour data of the operational state information is in the abnormal state. For example, if the every hour data generator 334 generates the every hour data for one day in the DRAM, the every hour data generator 334 stores the generated every hour data into the every hour data storage 323 of the flash memory, and the every hour data generator 334 outputs the every hour data to the every day data generator 335.

If the every day data generator 335 obtains the every hour data from the every hour data generator 334, the every day data generator 335 statistically processes the obtained every hour data to generate every day data. The statistical processing of the every day data generator 335 is the same as that of the every minute data generator 333 or the every hour data generator 334. For example, the every day data generator 335 stores the generated every day data into the every day data storage 324 of the flash memory.

For example, the statistic report generator 336 reads the time series data, such as the every minute data, from the storage 32, and the statistic report generator 336 generates statistic report data. The statistic report data is data in which device identification information, setting information, a determination result, and device power supply information are associated with each other. The setting information represents a transmission time interval of process data for the each device. The setting information represents a threshold for the each device. The determination result represents a determination whether the communication quality is good or not by comparing the statistic information of the communication quality information with a predetermined threshold value.

Here, the device power supply information is associated with the newest information among the latest data. The statistic report generator 336 stores the generated statistic report data into the statistic report storage 325. In addition, the statistic report generator 336 may determine whether the communication quality is good or not by comparing the every hour data and the every day data of the statistic information data with the predetermined threshold value, in order to generate the statistic report data. Moreover, for example, the statistic report generator 336 may determine whether the communication quality is good or not based on the calculated newest statistic information, or the statistic report generator 336 may determine whether the communication quality is good or not based on the statistic information specified by a user at an arbitrary time.

The transmission controller 337 transmits the data stored in the information processing device 3 to the information displaying device 4 through the communicator 31. For example, if the communicator 31 receives a request for obtaining the latest data from the information displaying device 4, the transmission controller 337 reads the latest data out of the latest data storage 321, and the transmission controller 337 transmits the read latest data to the information displaying device 4. For example, if the communicator 31 receives a request for obtaining the time series data from the information displaying device 4, the transmission controller 337 reads the every minute data, the every hour data, or the every day data out of the every minute data storage 322, the every hour data storage 323, or the every day data storage 324 respectively, and the transmission controller 337 transmits the read time series data to the information displaying device 4. For example, if the communicator 31 receives a request for obtaining the statistic report data from the information displaying device 4, the transmission controller 337 reads the statistic report data from the statistic report storage 325, and the transmission controller 337 transmits the read statistic report data to the information displaying device 4.

[Outline of Information Displaying Device]

Figure 7:
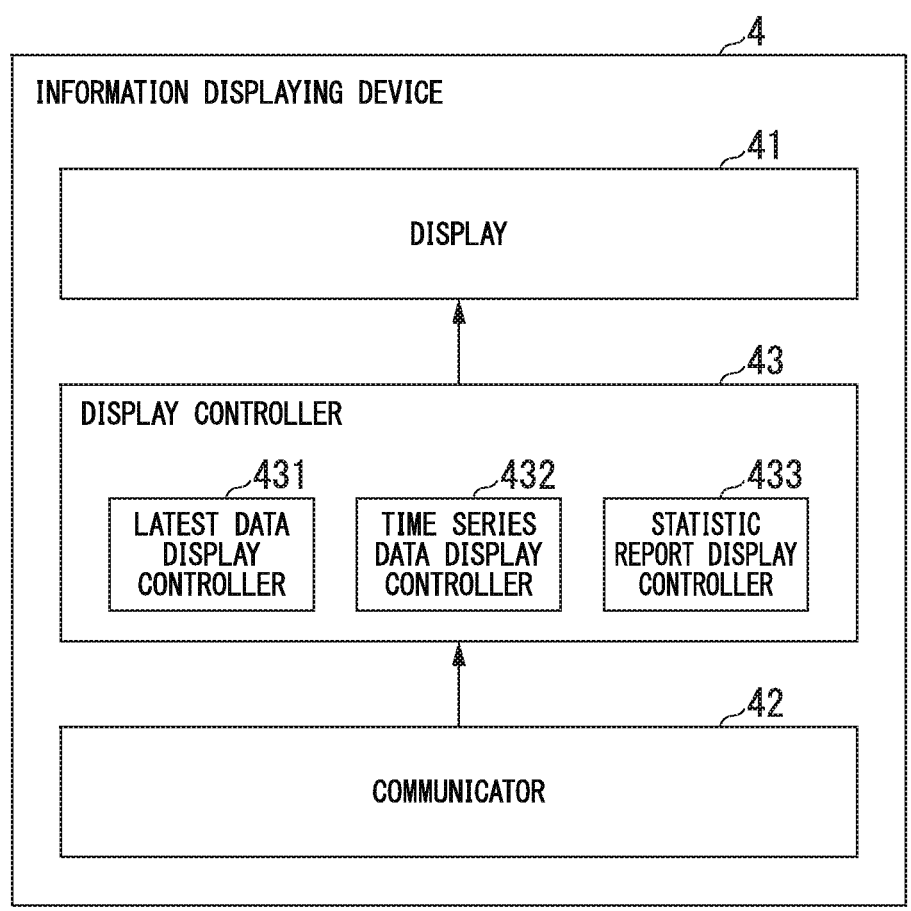
FIG. 7 is a block diagram illustrating an example of a schematic functional configuration of the information displaying device in the present embodiment.

FIG. 7 is a block diagram illustrating an example of a schematic functional configuration of the information displaying device in the present embodiment.

The information displaying device 4 is, for example, a personal computer, a mobile phone, a tablet, a smart phone, or a PDA (Personal Digital Assistant), and the information displaying device 4 is equipped with a CPU and a storage device. The information displaying device 4 is equipped with a display 41, a communicator 42, and a display controller 43. The information displaying device 4 may be equipped with input devices, such as a mouse, a keyboard, and a touch panel.

For example, the display 41 is equipped with a liquid crystal display, an organic EL (Electro-Luminescence) display, or the like.

The communicator 42 has a communication interface connected to the network 5, and the communicator 42 communicates with the information processing device 3.

The display controller 43 obtains data from the information processing device 3 through the communicator 42, and the display controller 43 displays the obtained data on the display 41. The display controller 43 is equipped with a latest data display controller 431, a time series data display controller 432, and a statistic report display controller 433.

The latest data display controller 431 transmits a request for obtaining the latest data to the information processing device 3. If the communicator 42 receives the latest data transmitted in accordance with the request for obtaining, the latest data display controller 431 displays the obtained latest data on the display 41.

The time series data display controller 432 transmits a request for obtaining the time series data to the information processing device 3. If the communicator 42 receives the time series data transmitted in accordance with the request for obtaining, the time series data display controller 432 displays the obtained time series data on the display 41.

The statistic report display controller 433 transmits a request for obtaining the statistic report data to the information processing device 3. If the communicator 42 receives the statistic report data transmitted in accordance with the request for obtaining, the statistic report display controller 433 displays the obtained statistic report data on the display 41.

[Outline of Display Mode by Information Displaying Device]

FIG. 8 is a drawing illustrating an example of display mode in a case of displaying the latest data.

The area A1 represents a first example of display mode of a screen displayed by the information displaying device 4. For example, the information displaying device 4 displays the first example of display mode at a time of starting or maintaining the system. The area A11 displays a tab which represents a subnet of the wireless network which is configured by the field device 1 and the access point 2. Moreover, identification information (for example, "10001" in FIG. 8) of the subnet and a state of the subnet are associated with each other, and are displayed in the area A1. The state of the subnet is shown by changing the color of the icon "o", which is positioned on the left side of the identification information of the subnet, in accordance with the communication quality of the field device connected to the subnet. The tab displayed in the area A11 can be selected, and the area A12 displays information of the field devices 1 connected to the subnet which is specified by the selected tab. In the example shown in FIG. 8, "All" which represents all the field devices 1 in a wireless network is selected.

A table shown in the area A12 represents the latest data of each field device.

The column C11 represents state icons showing a state of the field device 1. The state of the field device 1 is shown by changing the color of the state icon in accordance with the operational state information. In the example shown in FIG. 8, the state icon represents three states of "normal", "abnormal", and "alert" by using three patterns illustrated as items I11, I12, and I13, respectively.

"Device Tag" of the column C121, "Network ID" of the column C122, and "Vendor/Model" of the column C123 show the device identification information for identifying the field device 1. "Device Role" of the column C13 represents the setting information (role) of the field device 1. "Join Status" of the column C14 represents a connection status of the field device to the network. The connection status includes "Full Join" which represents that communication is connected and "Disconnected" which represents that communication is disconnected. "Operation Status" of the column C15 represents an operational status of the field device 1. The operational status of the field device includes "Published" which represents that process data is transmitted and "Not publish" which represents that process data is not transmitted.

"Interval" of the column C161 represents the latest data of the reception interval. "Latency" of the column C162 represents the latest data of the delay between transmission and reception. "Primary Router" of the column C163 represents an access point 2 which is used as a first route by the field device 1. "RSSI (P)" of the column C164 represents the latest data of the received signal strength indication of the field device 1 in a communication with the access point 2 used as the first route. "PER (P)" of the column C165 represents the latest data of the packet error rate of the field device 1 in a communication with the access point 2 used as the first route.

"Secondary Router" of the column C166 represents an access point 2 which is used as a second route by the field device 1. "RSSI (P)" of the column C167 represents the latest data of the received signal strength indication of the field device 1 in a communication with the access point 2 used as the second route. "PER (P)" of the column C168 represents the latest data of the packet error rate of the field device 1 in a communication with the access point 2 used as the second route. "CCA Back off" of the column C169 represents the latest data of a backed-off transmission rate and a channel number of which backed-off transmission rate has been calculated.

"Battery Life" of the column C171 and "Power Supply Status" of the column C172 represent device power supply information which represents a state of the power supply for the each device. "Battery Life" of the device power supply information represents a number of days until the battery residual quantity becomes zero or becomes a residual quantity with which the device cannot be operated. Moreover, "Power Supply Status" of the device power supply information represents a ratio of the battery residual quantity to the battery capacity. In addition, although not illustrated in the drawing, a column for displaying the loss number of process data may be prepared.

In the first example of the display mode, information obtained by statistically processing the latest data may be displayed in each item of the communication quality information. For example, the information displaying device 4 may display, in the item "Interval" of the column C161, a maximum value of the reception interval, which has been calculated until the screen is updated. For example, if an updating cycle of the screen is one minute, the information displaying device 4 displays the every minute data of the maximum value of the reception interval. Similarly, for example, the information displaying device 4 may display, in the item "Latency" of the column C162, a maximum value of the delay between transmission and reception, which has been calculated until the screen is updated. Moreover, for example, the information displaying device 4 may display, in the item "CCA Back off" of the column C169, a maximum value of the backed-off transmission rate for the each channel, which has been calculated within a predetermined time, together with a channel number corresponding to the maximum value. In addition, a channel number will be described later in an explanation of FIG. 16.

FIG. 9 is a drawing illustrating an example of display mode in a case of displaying the statistic report in the present embodiment.

The area A2 represents a second example of display mode of a screen displayed by the information displaying device 4. For example, the information displaying device 4 displays the second example of display mode at a time when the system has been started completely and has become in an operation state. The area A21 displays a list of subnets included in the wireless network.

Moreover, like the area A11 of FIG. 8, the identification information of the subnet and the state of the subnet are associated with each other and displayed on the area A21. In the example shown in FIG. 9, in addition to color, the state of the subnet is shown by design of the icon.

The check mark shown by the item I211 represents that all devices in the subnet are normal. The mark "!" shown by the item I212 represents that one or more devices which are in an alert state exist in the field devices 1 or the access points 2 in the subnet. The mark "x" shown by the item I213 represents that one or more devices which are in an abnormal state exist in the field devices 1 or the access points 2 in the subnet. The mark "?" shown by the item I214 represents an unknown state which means that states of the field devices 1 or the access points 2 in the subnet are being measured and the result has not been obtained yet. Hereinafter, the same marks are used for showing not only the state of the subnet but showing states of the devices. The meaning of each mark in a case of representing the state of the devices is the same as the meaning described above. The check mark represents a normal state, the mark "!" represents an alert state, the mark "x" represents an abnormal state, and the mark "?" represents an unknown state.

Each subnet displayed in the area A21 can be selected, and the area A22 and the area A23 display information of devices which are connected to the selected subnet. In the example shown in FIG. 9, "All" which represents all the devices in the wireless network is selected.

The area A22 represents a number of devices for the each state. The items 1221, 1222, and 1223 represent a number of the access points 2 for the each state of the devices. The items 1224, 1225, and 1226 show a number of the field devices 1 for the each state of the devices. The items 1221 and 1224 show a number of devices which are in the abnormal state. The items 1222 and 1225 show a number of devices which are in the alert state. The items 1223 and 1226 show a number of devices which are in the unknown state.

The table shown in the area A23 represents statistic information for the each device. The icon shown in the column C21 represents role and state of devices. In the example of FIG. 9, the role of the device is shown by a shape of the icon. For example, the shape "□" of the icon of the item I231 represents an access point 2. Further, for example, the shape "o" of the icon of the item I232 represents a field device 1. The characters "I" and "R" of the icon of the items I232 and I233 show a detailed classification of the field device 1. For example, the state of device may be shown by a color of an icon, as described by using the items I11, I12, and I13 of FIG. 8.

"Device Tag" of the column C221 and "Model" of the column C222 show the device identification information respectively, similar to the column C121 and the column C123 of FIG. 8. "Publication Period" of the column C23 represents a setting value (predetermined transmission time interval) of a transmission time interval of process data transmitted by the field device 1. "Alert Threshold" of the column C24 represents a setting state of a threshold value for determining the state of the field device 1. In the present embodiment, one of two threshold values is set to the field device 1 in accordance with its use. In the example shown in FIG. 9, setting of the threshold value is shown by a first threshold value "A" and a second threshold value "B". In the present embodiment, the second threshold value "B" is a value which is stricter in condition than the first threshold value "A". For example, the first threshold value is set to a field device 1 for monitoring. The second threshold value is set to a field device 1 for high-speed monitoring which transmits and receives information correctly in a short time interval, or set to a field device 1 of controlling a plant.

"Status" of the column C251 represents the operational state information. "Publication Loss" of the column C252 represents a comparison result between the statistic information of the loss number of process data and the threshold value. "Interval" of the column C253 represents a comparison result between the statistic information of the reception interval and the threshold value. "Latency" of the column C254 represents a comparison result between the statistic information of the delay between transmission and reception and the threshold value. "PER" of the column C255 represents a comparison result between the statistic information of the packet error rate and the threshold value. The information displaying device 4 displays the items of columns C252 to C255 based on the communication state information included in the statistic report data. Although not illustrated, a column for displaying a comparison result between the statistic information of the received signal strength indication or the backed-off transmission rate and the threshold value may be prepared.

"Power Status" of the column C26 represents device power supply information. The device power supply information is shown by an image which represents a power supply state of a device. If the power supply of the device is a battery, the device power supply information is displayed by superimposing, on the image, information representing details of the battery residual quantity, such as a numeral number indicating remaining days of the battery. Thereby, the information displaying device 4 can display a lot of information in a small area. The illustrated image, which is other than the battery, shows a device to which electrical power is supplied from a commercial power source (line connection). The area A24 represents a button for changing displayed contents of the display screen. For example, if the button of the area A24 is pushed, the information displaying device 4 may display the third example of display mode which will be described later.

For example, the displayed contents of the columns C252 to C255 are determined based on the statistic information, such as an average value and a maximum value of the communication quality information. For example, if the maximum value of the communication quality information is smaller than the threshold value, it is determined that the field device 1 is in a normal state with respect to the communication quality information. For example, if the maximum value of the communication quality information is larger than the threshold value and the average value is smaller than or equal to the threshold value, it is determined that the field device 1 is in an alert state with respect to the communication quality information. For example, if the average value of the communication quality information is larger than the threshold value, it is determined that the field device 1 is in an abnormal state with respect to the communication quality information. Although the statistic information used for displaying the columns C252 to C255 is the every minute data as an example, the statistic information may be the every hour data or the every day data.

FIG. 10 is a table showing an example of a selecting method of display mode in a case of displaying the device power supply information.

In the example shown in FIG. 10, "State Name" of the column C31 represents a classification about a state of power supply of a device. "State name" includes "Normal", "Alert", and "Unknown". These states are determined based on a type of the power supply and a determination of the battery residual quantity by using the threshold value. For example, if the type of the power supply is a line connection, "State name" is "Normal". For example, if the type of the power supply is a battery and the residual quantity of the battery is more than the predetermined threshold, "State name" is "Normal". For example, the type of the power supply is a battery and the residual quantity of the battery is less than or equal to the predetermined threshold, "State name" is "Alert".

"Power Supply Status" of the column C32 represents a type of the power supply and the battery residual quantity. "Power Supply Status" includes "Line Powered" which represents that electrical power is supplied from a line (power supply line), "100-75%", "75-25%", or "25-0%" which represents a battery residual quantity, and "Unknown" which represents that it is unknown.

"Image" of the column C33 represents an example of display mode in accordance with the state of the power supply. For example, if "Power Supply Status" of the column C32 is "Line Powered", an image which represents a line connection and is associated with "Line Powered" is selected as "Image". If "State name" of the column C31 is "Unknown", an image which represents unknown and is associated with "Unknown" is selected as "Image". If the power supply is a battery, an image of which "State name" is "Normal" or "Alert" is selected among images associated with "Power Supply" to which the battery residual quantity corresponds. Thus, the selected image is used for displaying the device power supply information shown in column C26 of FIG. 9.

Figure 11:
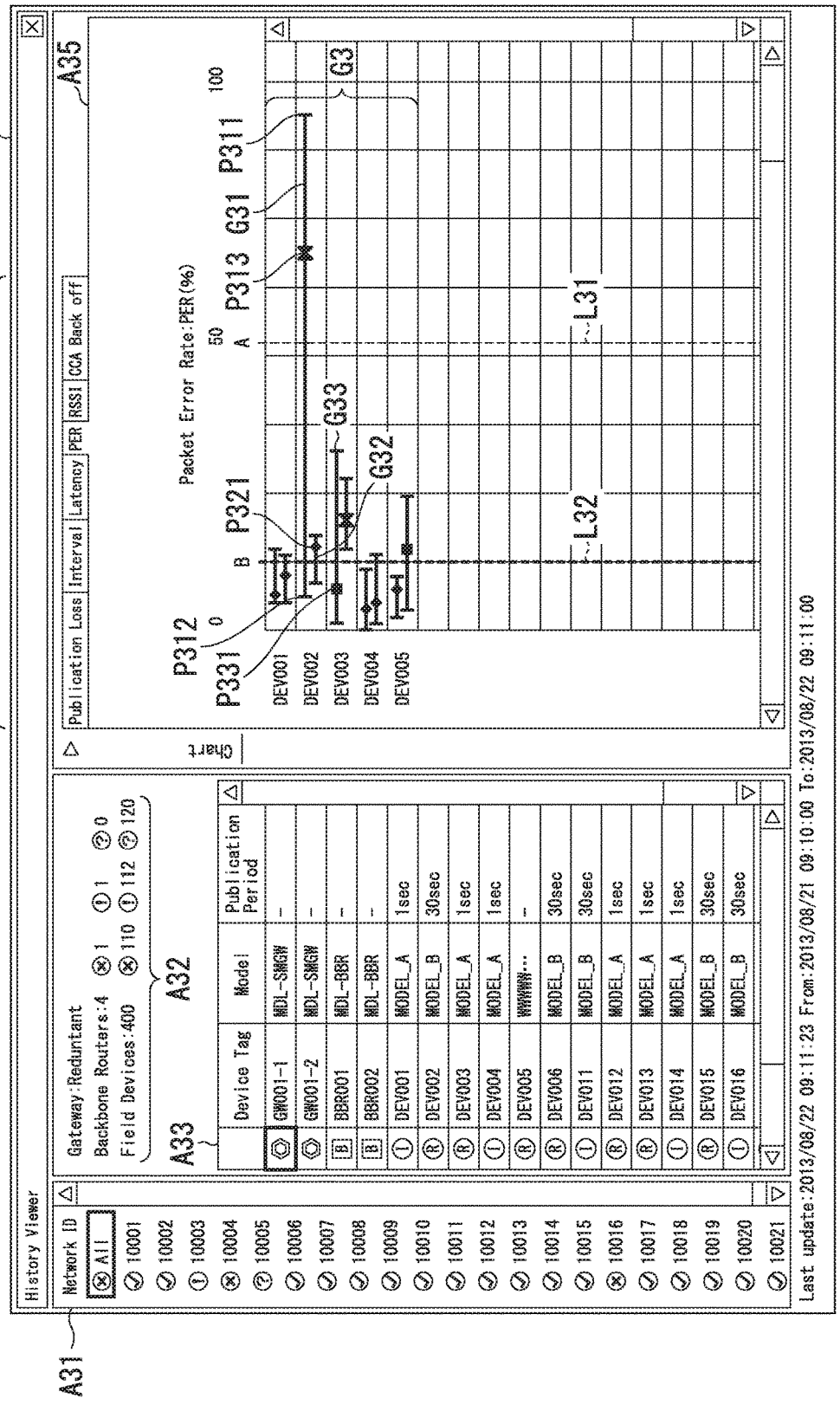
FIG. 11 is a drawing illustrating an example of display mode in a case of displaying a distribution of values of the communication quality information.

FIG. 11 is a drawing illustrating an example of display mode in a case of displaying a distribution of values of the communication quality information.

The area A3 represents a third example of display mode of a screen displayed by the information displaying device 4. For example, the information displaying device 4 displays the third example of display mode if a device and communication quality information, which is in the abnormal state or the alert state, exist in the display of the statistic report. The information shown in the area A31, the area A32, and the area A33 are the same as that of the area A21, the area A22, and the area 23 of FIG. 9 described above respectively.

The area A34 displays a tab which represents the communication quality information. The communication quality information displayed in the area A34 is the loss number of process data ("Publication Loss"), the reception interval ("Interval"), the delay between transmission and reception ("Latency"), the packet error rate ("PER"), the received signal strength indication ("RSSI"), and the backed-off transmission rate ("CCA Back off"). The tab displayed in the area A34 can be selected. The area A35 displays a distribution of the communication quality information shown by the selected tab, which is associated with the device identification information. In the example shown in FIG. 11, "PER" is selected, and a distribution of the packet error rate is shown in the area A35. The devices displayed in the area A35 may be changed in accordance with a selected subnet in the area A31 or a selected device in the area A33.

The dashed line L31 represents a first threshold value "A" for the communication quality information. The dashed line L32 represents a second threshold value "B" for the communication quality information. The graph G3 is a graph which represents a distribution of the communication quality information corresponding to the device identification information. The horizontal axis of the graph G3 shows values of the communication quality information. Since the field device 1 has two communication routes of the first route and the second route, two graphs including a graph which shows a distribution of the communication quality information of the first route and a graph which shows a distribution of the communication quality information of the second route are shown with respect to each device identification information of the area A35. For example, in the example shown in FIG. 11, a distribution of "PER" about the first route of the field device 1 which is represented by the device identification information "DEV002" is shown as a graph G31, and a distribution of "PER" about the second route is shown as a graph G32.

For example, the each graph which represents the distribution of the communication quality information is shown as a line which connects a maximum value, a minimum value, and an average value which are shown by the points P311, P312, and P313 respectively. Moreover, each of the graphs G3 is shown in accordance with a comparison result between the communication quality information and the threshold value associated with the device identification information. For example, if the threshold value of "DEV002" is the first threshold value "A", since the average value of "PER" shown by the graph G31 is greater than the first threshold value "A", the field device 1 is in the abnormal state with respect to "PER". Therefore, the point P313 representing the average value of the graph G31 is shown as "x" representing the abnormal state. Although the maximum value, the minimum value, and the average value of the every minute data are shown in the graph showing the distribution of the communication quality information as an example, the maximum value, the minimum value, and the average value of the every hour data or the every day data may be shown.

Moreover, for example, since the point of the maximum value shown by the graph G32 is smaller than the first threshold value "A", the field device 1 is in the normal state with respect to "PER". Therefore, the point P321 representing the average value of the graph G313 is shown as "o" representing the normal state. For example, if the threshold value of the "DEV003" is the second threshold value "B", since the maximum value of "PER" shown by the graph G33 is greater than the second threshold value "B" and the average value is smaller than the second threshold value "B", the point P331 representing the average value of the graph G33 is shown as "□" representing the alert state. Each graph may be classified by color and shown in accordance with the state of the field device 1.

Figure 12:
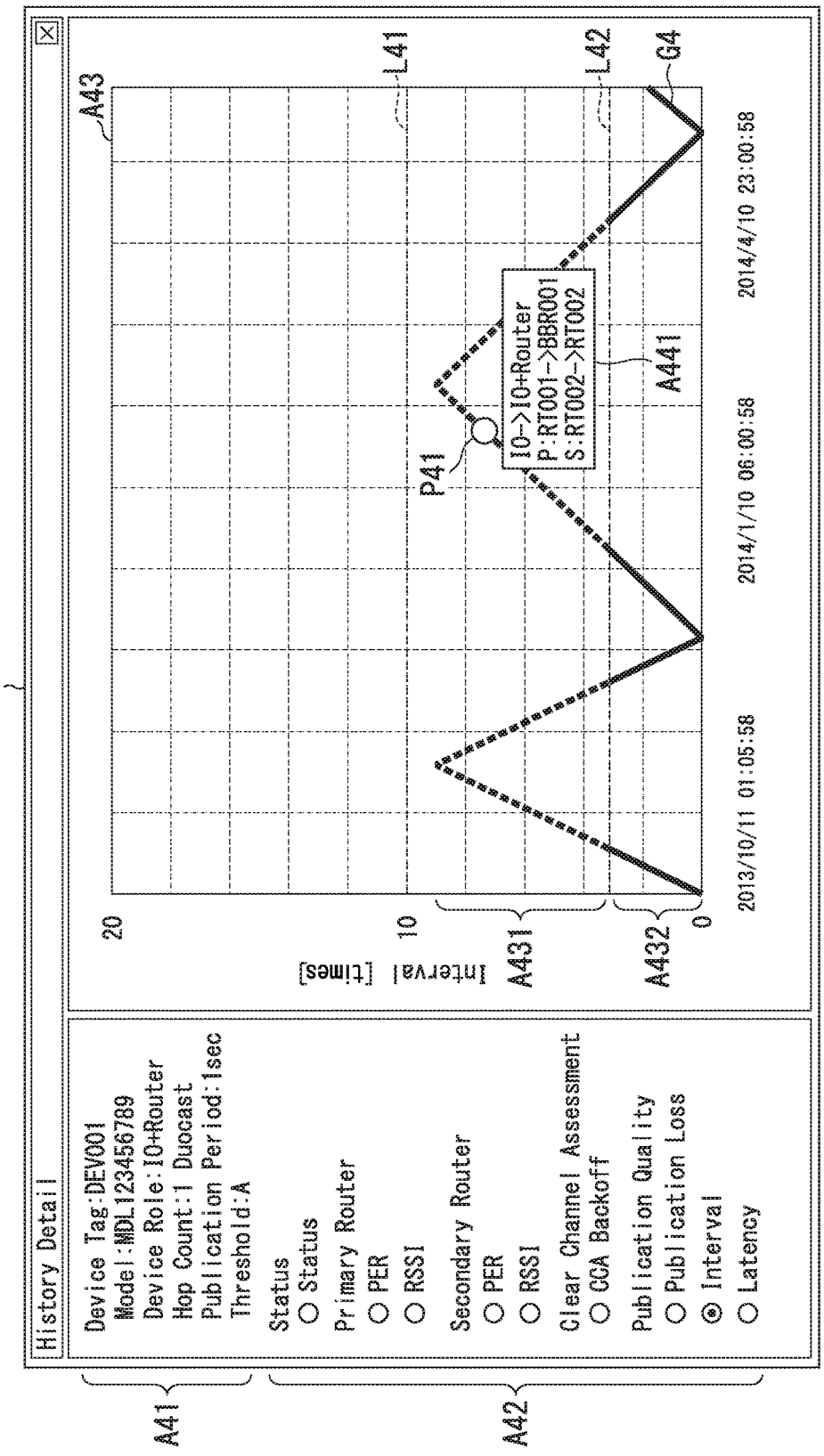
FIG. 12 is a drawing illustrating an example of display mode in a case of displaying the time series data of the communication quality information.

FIG. 12 is a drawing illustrating an example of display mode in a case of displaying the time series data of the communication quality information.

The area A4 represents a fourth example of display mode of a screen displayed by the information displaying device 4. For example, the information displaying device 4 displays the fourth example of display mode if a device which is in the abnormal state or the alert state exists. The area A41 represents device identification information and settings of the field device 1 of which time series data is displayed. The area A42 represents a selection situation of the communication quality information of which time series data is displayed. Items which can be selected in the area A42 is almost the same as the items which can be selected in the area A34 of FIG. 11. The packet error rate and the received signal strength indication can be selected with the first route and the second route being distinguished. The area A43 shows a graph of the time series data of the communication quality information selected in the area A42. Although the time series data shown in the area A43 is the every minute data as an example, the time series data may be the every hour data or the every day data. The vertical axis of the graph shown in the area A43 represents the value of the communication quality information. The horizontal axis of the graph shown in the area A43 represents day and time. The dashed line L41 represents a fluctuation acceptable value (Stale Limit) of the reception interval. The dashed line L42 represents a threshold value.

In the example shown in FIG. 12, the reception interval "Interval" is selected in the area A42, and the graph G4 of the reception interval "Interval" corresponding to the selection is displayed in the area A43. As shown in the area A41, the second threshold value "B" is set as the threshold value "Threshold" (dashed line L42). The area A431 represents a range where the field device 1 is in the alert state, among the graph G4 representing the time series data of the reception interval. The area A432 represents a range where the maximum value is less than or equal to the threshold value and it is in the normal state, among the graph G4. Thereby, a user of the information displaying device 4 can easily check a change-with-time of the state of the communication quality. The user of the information displaying device 4 can easily check a margin of the reception interval with respect to the fluctuation acceptable value.

Marker "o" of the point P41 represents a change of setting of the threshold value or a change of the route. The area A441 represents details of the change. For example, if the marker of the point P41 is selected by a mouse-over, route information of the area A441 may be displayed.

Figure 13:
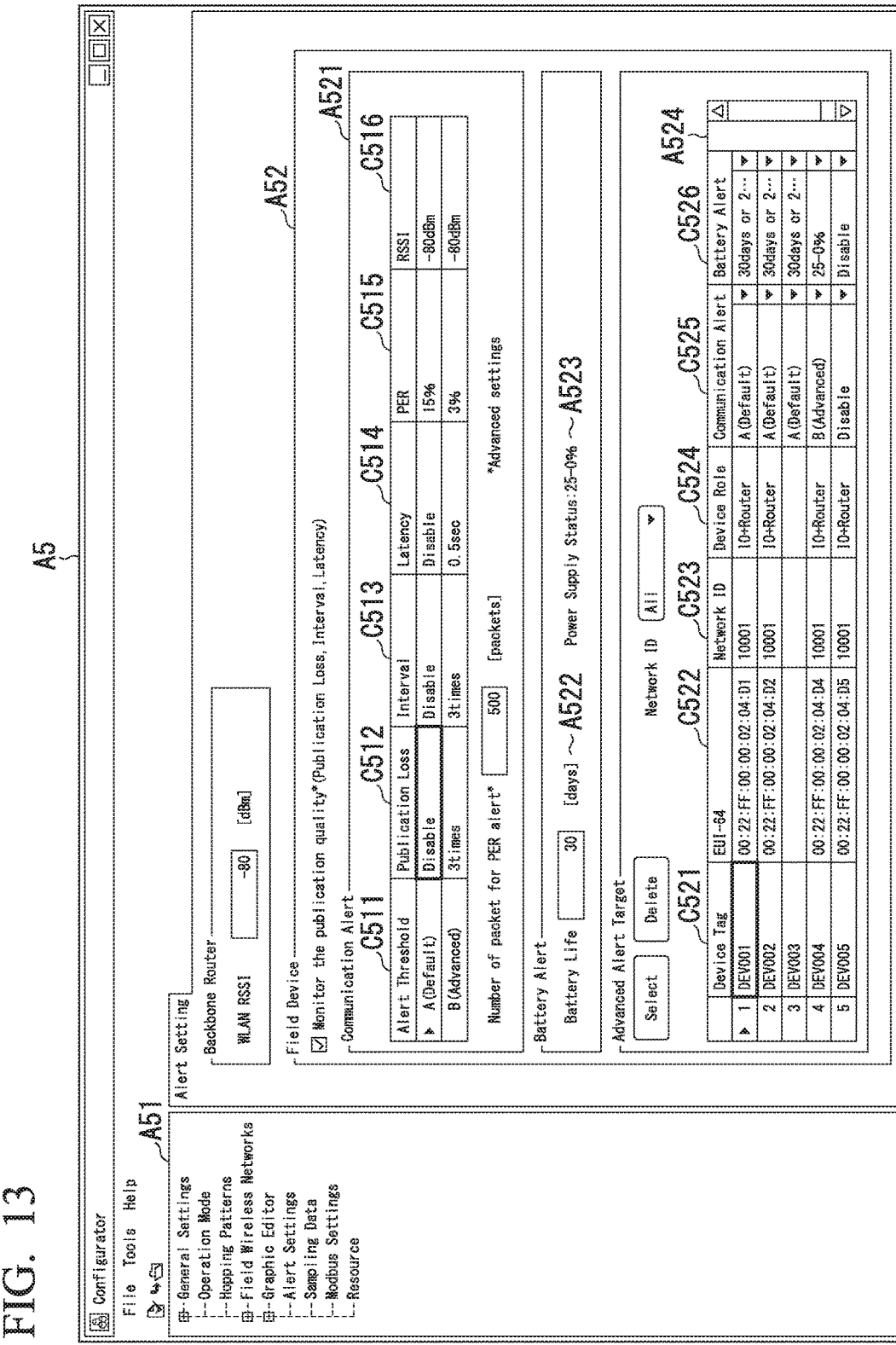
FIG. 13 is a drawing illustrating an example of display mode of a screen for setting the threshold value which is compared with the statistic information.

FIG. 13 is a drawing illustrating an example of display mode of a screen for setting the threshold value which is compared with the statistic information.

The area A5 represents a fifth example of display mode of a screen displayed by the information displaying device 4. The area A51 is an area for selecting a setting item. The area A52 is an area for setting the threshold value which is compared with the statistic information of the communication quality information. The area A521 is an area for setting the threshold value about the communication quality information of the field device 1. The column C511 of the table shown in the area A521 represents whether the set threshold value is the first threshold value "A" or the second threshold value "B". The column C512 represents the threshold value of the loss number of process data. The column C513 represents the threshold value of the reception interval. The column C514 represents the threshold value of the delay between transmission and reception. The column C515 represents the threshold value of the packet error rate. The column C516 represents the threshold value of the received signal strength indication. Each item of the columns C512 to C516 can be selected and input, and a desired value may be set as the threshold value. Moreover, "Disable" may be set to an arbitrary item of the columns C512 to C516 so that any threshold value is not set and the information displaying device 4 does not notify the alert state or the abnormal state about the item. Although not illustrated, a column for setting the threshold value of the backed-off transmission rate may be prepared.

The areas A522 and A523 show the threshold value about the battery residual quantity of the field device 1. The area A522 is an area for setting a scheduled number of days until the battery residual quantity becomes zero or becomes a residual quantity with which the device cannot be operated, as a threshold value with respect to the device power supply information. The area A523 is an area for setting a ratio of a battery residual quantity to a battery capacity, as a threshold value with respect to the device power supply information.

The area A524 is an area for selecting a threshold value which is compared with the statistic information of the communication quality information. In the table shown in the area A524, the columns C521, C522, and C523 show the device identification information. The column C524 represents setting information (role) of the field device 1. The column C525 represents either the first threshold value "A" or the second threshold value "B", where one of them can be selected as a threshold value with respect to the communication quality information. The column C526 represents either of the scheduled number of days until the battery residual quantity becomes zero or becomes a residual quantity with which the device cannot be operated and the ratio of a battery residual quantity, or both of them, where one of them can be selected as a threshold value with respect to the device power supply information.

[Outline of Improving Method of Communication Quality]

Figure 14:
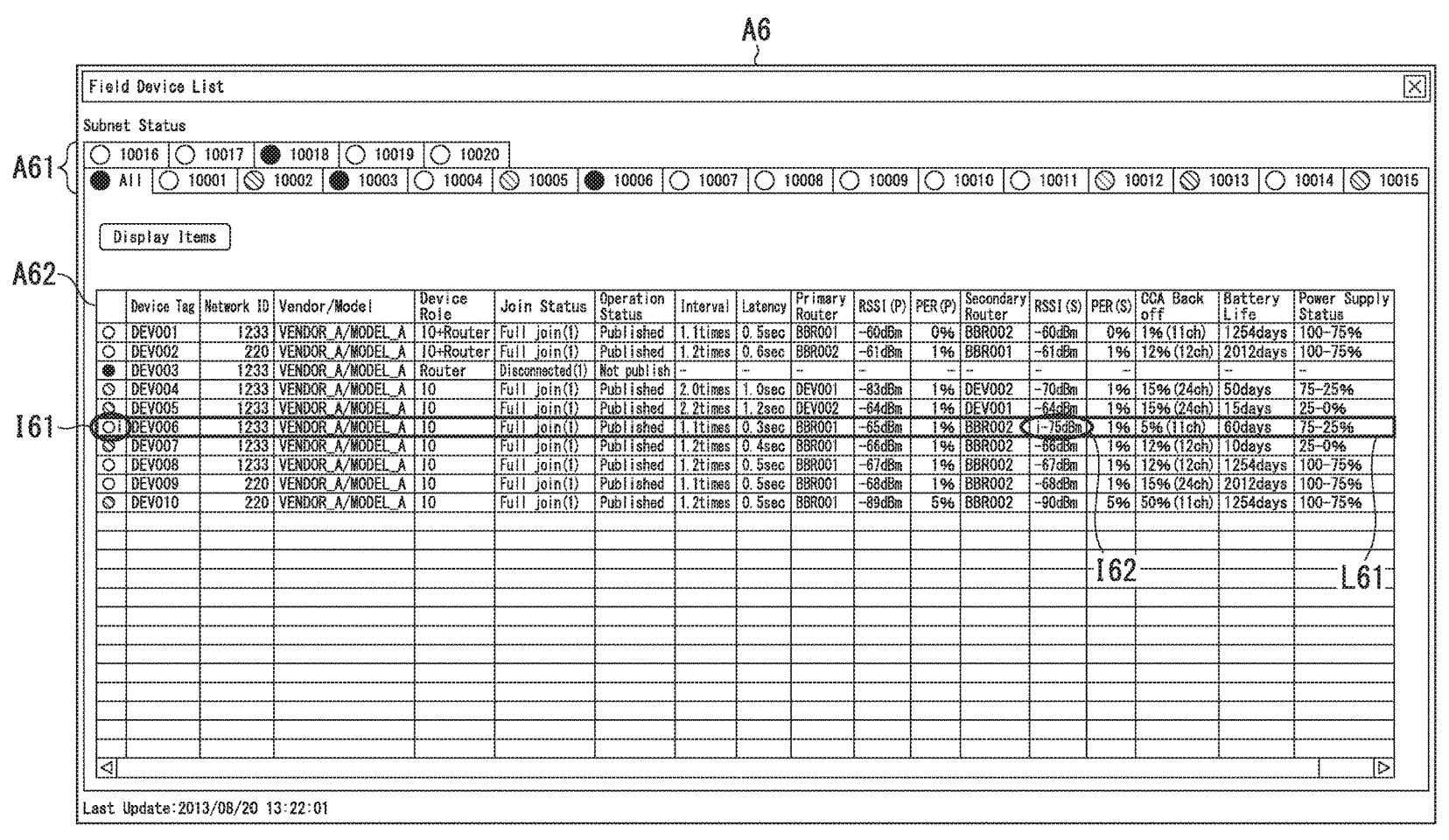

FIG. 14 is a drawing illustrating an example of display mode in a case of displaying the latest data.

The area A6 represents a sixth example of display mode of a screen displayed by the information displaying device 4. The items shown in the area A61 is the same as the items shown in the area A11 of FIG. 8. Moreover, the table shown in the area A62 is the same as the table shown in the area A12 of FIG. 8. At the item I61 which is a state icon in the line L61 of the area A62, a character "i" is added to the right side of the state icon "○". At the item I62 which is "RSSI (S)" in the line L61 of the area A62, "i-75 dBm" is displayed. The "i" is a character for notifying that an access point 2, which can provide a communication quality which is better than the communication quality of the first route or the second route, exists. In the example shown in FIG. 14, "i" is shown in the received signal strength indication of the second route, and an access point 2 of which received signal strength indication is better than that of the access point 2 of the second route exists.

Figure 15:
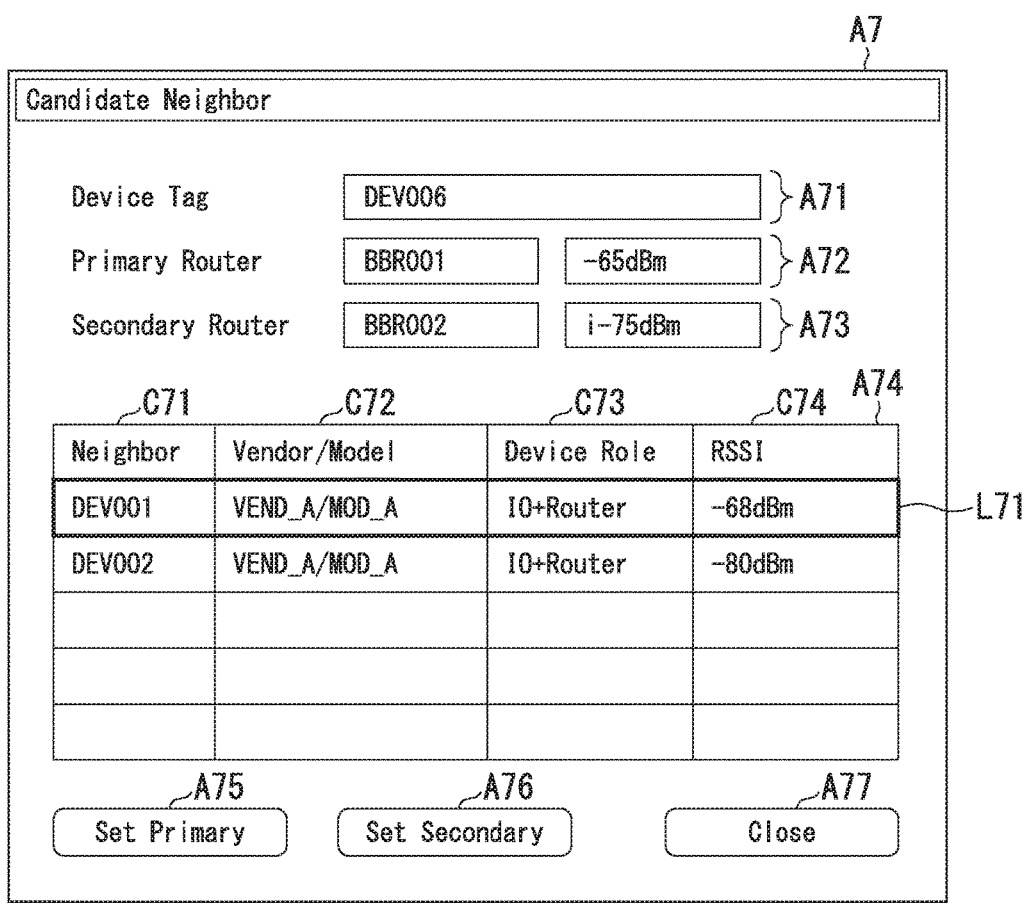
FIG. 15 is a drawing illustrating an example of display mode of a screen for setting a communication route of the field device.

FIG. 15 is a drawing illustrating an example of display mode of a screen for setting a communication route of the field device 1.

The area A7 represents a seventh example of display mode of a screen displayed by the information displaying device 4. For example, if the item I61 or the item I62 in FIG. 14 described above is selected, the information displaying device 4 changes the display mode to the seventh example. In the example shown in FIG. 15, the area A71 represents device identification information which is "DEV006". The area A72 represents the device identification information of the access point 2 of the first route and the communication quality information about the access point 2. In the example shown in FIG. 15, the access point 2 of the first route is "BBR001", and the received signal strength indication of the communication quality information is "−65 dBm". The area A73 represents the device identification information of the access point 2 of the second route and the communication quality information about the access point 2. In the example shown in FIG. 15, the access point 2 of the second route is "BBR002", and the received signal strength indication of the communication quality information is "i-75 dBm".

The table shown in the area A74 represents information of the access point 2 which can be set as the first route or the second route by the device shown in the area A71. Each line of the table can be selected. "Neighbor" of the column C71 and "Vendor/Model" of the column C72 represent device identification information of the access point 2 which can be set as the first route or the second route by the device shown in the area A71. "Device Role" of the column C73 represents setting information (role). "RSSI" of the column C74 represents received signal strength indication. The area A75 represents a button for setting the access point 2 selected in the area A74 as the first route. The area A76 represents a button for setting the access point 2 selected in the area A74 as the second route. The area A77 represents a button for ending the setting of communication route.

In the example shown in FIG. 15, the received signal strength indication of "DEV001" shown in the line L71 is "−68 dBm". The received signal strength indication is better than "−75 dBm" of the received signal strength indication of the second route shown in the area A73. Therefore, if "DEV001" is set as an access point 2 of the second route of "DEV006" by selecting the line L71 and pushing the button shown in the area A76, the communication quality of the second route can be improved. If a number of hops changes in accordance with the change of the setting, the information displaying device 4 may notify that the delay between transmission and reception may be influenced.

Figure 16:
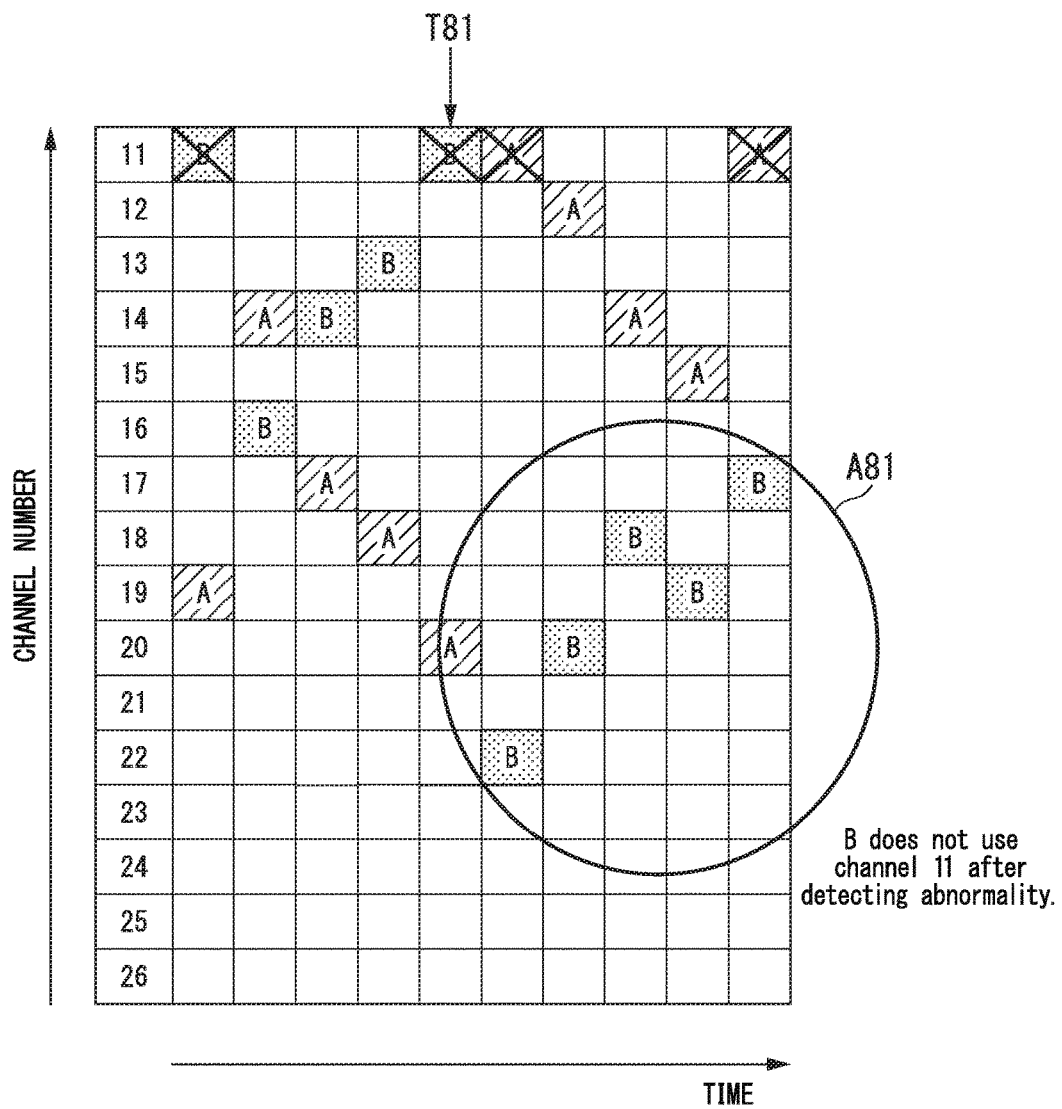
FIG. 16 is a drawing illustrating an example of a change-with-time of a frequency band which is used for communication by the field device.

FIG. 16 is a drawing illustrating an example of a change-with-time of a frequency band which is used for communication by the field device 1.

In FIG. 16, the vertical axis represents a frequency band (channel number). The horizontal axis represents time. "A" represents a field device 1 for normal monitoring, to which the first threshold value has been set. "B" represents a field device 1 for high-speed monitoring or controlling, to which the second threshold value has been set. As shown in FIG. 16, the information processing device 3 has detected an abnormality of the channel "11" in the time zone T81. For example, an abnormality about a channel is determined based on the backed-off transmission rate and the threshold value described above. The field device 1 "B" requires an excellent communication quality. Therefore, after the time zone T81, the channel "11" of which abnormality has been detected is not assigned to the field device 1 "B", but the frequency bands from the channel "17" to the channel "22" are assigned as shown in the area A81.

On the other hand, the field device 1 "A" for normal monitoring does not require an excellent communication quality, not the same as the field device 1 "B". Moreover, a number of the channels which can be used by the field device 1 is limited. Therefore, after the time zone T81, the channel "11" is assigned to the field device 1 "A" preferentially so that the field device 1 "B" can use the channel of normal state preferentially. Thereby, shortage of channel resource can be avoided, and constancy of communication in a whole system can be maintained. The setting may be performed manually or automatically.

CONCLUSION

For example, a factor which spoils the stability of communication route may be an existence of a wireless device using a band which overlaps with a frequency band used in the communication route or an existence of a physical obstacle which blocks the communication route. The influence of these obstacles may be temporary or long-term. However, since the conventional technology uses only communication quality information which has been obtained recently, the influence of the obstacles cannot be analyzed in view of a time.

On the other hand, the information displaying device 4 of the present embodiment has the display 41 and the display controller 43. The display controller 43 displays, on the display 41, the statistic information associated with the device identification information for identifying the field device 1. The statistic information is obtained by the information processing device 3 which statistically processes the communication quality information over a predetermined period. The communication quality information represents a communication quality between the field device 1 installed in the plant and the information processing device 3. Thereby, the information displaying device 4 can show intelligibly whether the communication route is stable for a long time or not.

Moreover, the display controller 43 displays, on the display 41, the device power supply information associated with the device identification information. The device power supply information represents a battery residual quantity of the field device 1. Thereby, the information displaying device 4 can show the battery residual quantity of the field device 1 intelligibly. Therefore, the user of the information displaying device 4 can maintain the stability of the communication route.

Moreover, the display controller 43 displays, on the display 41, a comparison result between the statistic information and a threshold value, which is associated with the device identification information. The threshold value is set for determining whether the communication quality of the field device 1 is good or not. Thereby, even if the information displaying device 4 does not check a numerical value of the statistic information, the information displaying device 4 can show intelligibly whether the state of the communication route is good or not. Therefore, the information displaying device 4 can show more intelligibly whether the communication route is stable for a long time or not.

Moreover, a different value is settable for the each field device 1 as the threshold value. Thereby, the information displaying device 4 can show intelligibly whether the state of the communication route is good or not, in accordance with a determination standard based on a use of the field device 1. Therefore, the information displaying device 4 can show more intelligibly whether the communication route is stable for a long time or not.

Moreover, the display controller 43 displays, on the display 41, a distribution of the communication quality information over a predetermined period such as one minute and one hour, which is associated with the device identification information. Moreover, the display controller 43 displays, on the display 41, the statistic information together with the distribution of the communication quality information. Thereby, for example, the information displaying device 4 can show briefly the communication quality of the communication route from the past to the present time. Therefore, the information displaying device 4 can show more intelligibly whether the communication route is stable for a long time or not.

Moreover, the display controller 43 further displays, on the display 41, a change-with-time of the communication quality information. Thereby, the information displaying device 4 can show details of the communication quality of the communication route from the past to the present time. Therefore, the information displaying device 4 can show more intelligibly whether the communication route is stable for a long time or not.

Moreover, the display controller 43 displays, on the display 41, a notification associated with the device identification information. The notification represents that an access point 2 of another communication route, which is better in a communication quality represented by the communication quality information than an access point 2 of a communication route currently used by the field device 1, exists with respect to the same field device 1. Thereby, the user of the information displaying device 4 can set, to the field device 1, a communication route of which communication quality is higher.

Moreover, the information processing device 3 has a calculator 332, a statistic processor, and an output device. The calculator 332 calculates communication quality information by using at least one of communication normality information and process data which have been transmitted from a field device 1 installed in a plant. The communication quality information represents a communication quality of the field device 1. The every minute data generator 333, the every hour data generator 334, and the every day data generator 335, each of which is the statistic processor, obtain statistic information by statistically processing the communication quality information calculated by the calculator 332 over a predetermined period. The transmission controller 337 which is the output device outputs the statistic information obtained by the statistic processor. Thereby, the information displaying device 4 can generate data for showing more intelligibly whether the communication route is stable for a long time or not, and can output it.

Moreover, the information displaying device 4 displays a backed-off transmission rate. Thereby, for example, if an abnormality about a packet error rate is detected, the user of the information displaying device 4 can determine whether the factor is a shortage of a received signal strength indication or interference by an external noise. Therefore, for example, the user of the information displaying device 4 can set more appropriately a hopping pattern of a channel used by the field device 1, and can improve the communication quality of the communication route.

Moreover, the information displaying device 4 displays a received signal strength indication. Thereby, for example, the user of the information displaying device 4 can determine that an obstacle has been generated in the communication route, and that an installation position of the field device 1 is unsuitable. Moreover, for example, the user of the information displaying device 4 can determine whether it is a temporary obstacle generated by passing of a large vehicle, or a long-term obstacle generated by a growth of plants. The user of the information displaying device 4 can appropriately select measures, such as rearrangement of a device, use of an extended antenna, use of a high gain antenna, and prohibition of entering into a wireless route, and can improve the communication quality of the communication route.

Moreover, the information displaying device 4 displays a reception interval. Thereby, for example, since the user of the information display device 4 can check how much margin for a fluctuation tolerance is there with respect to the calculated reception interval, the user can check the communication quality of the communication path more correctly. Moreover, if there is an abnormality in the reception interval, the user of the information displaying device 4 can appropriately select measures, such as adding a retry slot used by the field device 1, and can improve the communication quality of the communication route.

Moreover, the information displaying device 4 displays a delay between transmission and reception. Thereby, for example, since the user of the information displaying device 4 can check a frequency of the delay between transmission and reception of a signal, the user can check the communication quality of the communication route more correctly. Moreover, if there is an abnormality in the delay between transmission and reception, the user of the information displaying device 4 can appropriately select measures, such as decreasing a number of hops in the communication route, and can improve the communication quality of the communication route.

Moreover, the information displaying device 4 displays a loss number of process data. Unlike the packet error rate which does not represent whether or not the process data has been actually reached a transmission destination by a retry or a communication of a redundant route, the loss number of process data can represent the information. Therefore, the user of the information displaying device 4 can determine the communication quality of the wireless communication correctly, in accordance with the same standard as a wired communication of which communication quality is determined based on whether the process data has been reached or not.

In addition, arbitrary items may be displayed in the above-described example of the display of the information displaying device 4. For example, an item, which represents a comparison result between the statistic information of the received signal strength indication and the threshold value, may be shown in the table shown in the area A23 of FIG. 9.

Moreover, arbitrary items may be related with information and classified by color in the above-described example of the display of the information displaying device 4. For example, if "Join Status" of the column C14 shown in the area A12 of FIG. 8 is "Disconnected", the information displaying device 4 may display the item with a red character, and may represent that it is in an abnormal state. Moreover, for example, if "PER (P)" of the column C165 and "PER (S)" of the column C168 exceed a predetermined threshold value, the information displaying device 4 may display the item with a yellow character, and may represent that it is in an alert state. Moreover, for example, if "RSSI (P)" of the column C164 and "RSSI (S)" of the column C167 are smaller than a predetermined threshold value, the information displaying device 4 may display the item with a yellow character, and may represent that it is in an alert state. Moreover, for example, if "Battery Life" of the column C171 is smaller than a predetermined threshold value, the information displaying device 4 may display the item with a yellow character, and may represent that it is in an alert state. Moreover, for example, the classification by color may be performed by painting out a cell or a character, without changing a color of a character. Moreover, the information processing device 3 may represent information by hatching or attaching an underline. Thus, the information displaying device 4 may display information by using arbitrary visual effects.

In addition, the statistic information shown in the above-described example of the display of the information displaying device 4 may be statistically processed over an arbitrary period. For example, each item of the columns C252 to C255 shown in the area A23 of FIG. 9 may be a comparison result between the every minute data and a threshold value, and may also be a comparison result between the every hour data and a threshold value. For example, the graph shown in the area A43 of FIG. 12 may be the every minute data, the every hour data, and the every day data. The information processing device 3 may statistically process the communication quality information over a period, which is not limited to one minute, one hour, or one day. For example, the information processing device 3 may calculate the statistic information based on the communication quality information over an arbitrary period, such as five minutes, half a day, and so on.

In addition, although an example where the field device 1 and the access point 2 are connected to each other through the wireless network has been described, the field device 1 and the access point 2 may be connected to each other by a cable. In this case, the information processing device 3 does not need to calculate a received signal strength indication which is specifically suitable for the determination of the communication quality of the wireless communications.

In addition, a part of the information processing device 3 and the information displaying device 4 in the above-described embodiment, for example, the obtainer 331, the calculator 332, the every minute data generator 333, the every hour data generator 334, the every day data generator 335, the statistic report generator 336, the transmission controller 337, and the display controller 43, may be implemented by a computer. In this case, a program for implementing the function may be stored in a computer-readable storage medium, a computer system may read the program stored in the storage medium, and the program may be executed. Here, "computer system" is a computer system built in the information processing device 3 and the information displaying device 4, and includes an OS (Operating System) and hardware of a peripheral device.

Moreover, "computer-readable storage medium" means a storage device, such as a flexible disk, a magnetic optical disk, a ROM, a portable medium such as a CD-ROM, and a hard disk built in the computer system. Moreover, the above-described program may be for implementing a part of the above-described functions described above, and may be also a program which can implement the above-described functions in combination with a program which has been already stored in the computer system.

Moreover, a part of or all of the information processing device 3 and the information displaying device 4 in the above-described embodiment may be implemented as an integrated circuit, such as an LSI (Large Scale Integration). Each functional part of the information processing device 3 and the information displaying device 4 may be made individually as a processor, and a part of or all of them may be made as a processor by integrating them. Moreover, the technique of making an integrated circuit may be implemented as a dedicated circuit or a general-purpose processor, not limited to an LSI. Moreover, if a technology of making an integrated circuit which is a substitute for the LSI is designed by progress of semiconductor technology, an integrated circuit made by the technology may be used. Moreover, the information processing device 3 and the information displaying device 4 may be integrated as a device.

As described above, although an embodiment of the invention has been described in detail with reference to drawings, the specific configuration is not limited to the above-described configuration, and various changes of design may be made without departing from the spirit of the inventions.

The invention claimed is:

1. An information processing device comprising:
   a calculator configured to calculate communication quality information by using at least one of communication normality information and process data which have been transmitted from a field device installed in a plant, the communication quality information representing a communication quality of the field device;
a statistic processor configured to obtain statistic information by statistically processing the communication quality information calculated by the calculator over a predetermined period;
an output device configured to output the statistic information obtained by the statistic processor;
a large capacity nonvolatile memory; and
a large capacity volatile memory which has a longer life about a number of writing times than the large capacity nonvolatile memory,
wherein the communication quality information comprises a loss number of the process data,
wherein the calculator is configured to calculate the loss number of the process data by subtracting a sequence number of process data received previously from the field device from a sequence number of process data received most recently from the field device,
wherein the statistic processor is configured to generate every minute data by statistically processing latest data of the communication quality information every minute, to generate every hour data by statistically processing the every minute data every hour, and to generate every day data by statistically processing the every hour data every day,
wherein the large capacity nonvolatile memory stores the every minute data, the every hour data, and the every day data,
wherein the large capacity volatile memory temporarily stores the latest data of the communication quality information, and
wherein the latest data stored in the large capacity volatile memory has a higher updating frequency than the every minute data, the every hour data, and the every day data stored in the large capacity nonvolatile memory.

2. The information processing device according to claim 1,
wherein the calculator is configured to calculate a packet error rate based on a number of times of communication failure and a number of times of communication success which are included in the communication normality information, and
wherein the statistic processor is configured to obtain the statistic information by statistically processing the packet error rate calculated by the calculator over the predetermined period.

3. The information processing device according to claim 1,
wherein the calculator is configured to calculate a received signal strength indication based on a measured received signal strength indication which is included in the communication normality information, and
wherein the statistic processor is configured to obtain the statistic information by statistically processing the received signal strength indication calculated by the calculator over the predetermined period.

4. The information processing device according to claim 1,
wherein the calculator is configured to calculate a backed-off transmission rate based on a number of times of backed-off transmission and a total number of transmission slots, and
wherein the statistic processor is configured to obtain the statistic information by statistically processing the backed-off transmission rate calculated by the calculator over the predetermined period.

5. The information processing device according to claim 1,
wherein the calculator is configured to calculate a delay between transmission and reception based on a process data reception time of the information processing device and a transmission time which is added by the field device when transmitting, and
wherein the statistic processor is configured to obtain the statistic information by statistically processing the delay between transmission and reception calculated by the calculator over the predetermined period.

6. The information processing device according to claim 1,
wherein the calculator is configured to calculate a reception interval of process data based on a latest reception time of process data, a previous reception time of process data, and a predetermined transmission time interval, and
wherein the statistic processor is configured to obtain the statistic information by statistically processing the reception interval calculated by the calculator over the predetermined period.

7. The information processing device according to claim 1, further comprises a small capacity nonvolatile memory,
wherein the small capacity nonvolatile memory stores index information which is information about storage locations of the every minute data, the every hour data, and the every day data stored in the large capacity nonvolatile memory.

8. An information displaying system which displays information obtained from a plant, comprising:
an information processing device according to claim 1; and
an information displaying device configured to display the statistic information output from the information processing device.

9. An information displaying method comprising:
controlling the information displaying system of claim 8, wherein the controlling comprises:
receiving, from the information processing device, statistic information obtained by the information processing device which statistically processes communication quality information over a predetermined period, the communication quality information representing a communication quality between a field device installed in the plant and the information processing device; and
displaying, on a display, the statistic information in association with device identification information for identifying the field device,
wherein the communication quality information comprises a loss number of process data calculated by subtracting a sequence number of process data received previously from the field device from a sequence number of process data received most recently from the field device.

10. The information displaying method according to claim 9, further comprising:
calculating communication quality information, before obtaining the statistic information, by using at least one of communication normality information and process data which have been transmitted from the field device installed in the plant, the communication quality information representing a communication quality of the field device.

11. The information displaying system according to claim 8,
wherein the information displaying device comprises:
a display; and
a display controller configured to display, on the display, the statistic information associated with device identification information for identifying the field device.

12. The information displaying system according to claim 8, wherein the information displaying device comprises:
a display;
a receiver configured to receive, from the information processing device, statistic information obtained by the information processing device which statistically processes communication quality information over a predetermined period, the communication quality information representing a communication quality between a field device installed in the plant and the information processing device; and
a display controller configured to display, on the display, the statistic information received by the receiver in association with device identification information for identifying the field device,
wherein the communication quality information comprises a loss number of process data calculated by subtracting a sequence number of process data received previously from the field device from a sequence number of process data received most recently from the field device.

13. The information displaying system according to claim 12,
wherein the communication quality information is information calculated by using at least one of communication normality information and process data which have been transmitted from the field device.

14. The information displaying system according to claim 12,
wherein the display controller is configured to display, on the display, device power supply information associated with the device identification information, and the device power supply information represents a battery residual quantity of the field device.

15. The information displaying system according to claim 12,
wherein the display controller is configured to display, on the display, a comparison result between the statistic information and a threshold value, which is associated with the device identification information, and the threshold value is set for determining whether the communication quality of the field device is good or not.

16. The information displaying system according to claim 15,
wherein a different value is settable for the each field device as the threshold value.

17. The information displaying system according to claim 12,
wherein the display controller is configured to display, on the display, a distribution of the communication quality information over a predetermined period, which is associated with the device identification information.

18. The information displaying system according to claim 17,
wherein the display controller is configured to display, on the display, the statistic information together with the distribution of the communication quality information.

19. The information displaying system according to claim 12,
wherein the display controller is configured to further display, on the display, a change-with-time of the communication quality information.

20. The information displaying system according to claim 12,
wherein the display controller is configured to display, on the display, a notification associated with the device identification information, and the notification represents that another communication route, which is better in a communication quality represented by the communication quality information than a communication route currently used by the field device, exists with respect to the same field device.

* * * * *